US012600883B2

(12) United States Patent (10) Patent No.: US 12,600,883 B2
Antao et al. (45) Date of Patent: Apr. 14, 2026

(54) PROCESS TO SYNTHESIZE/INTEGRATE DURABLE/ROBUST LOW SURFACE ENERGY "HYDROPHOBIC" DROPWISE CONDENSATION PROMOTER COATINGS ON METAL AND METAL OXIDE SURFACES

(71) Applicant: The Texas A&M University System, College Station, TX (US)

(72) Inventors: Dion S. Antao, College Station, TX (US); Ruisong Wang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 524 days.

(21) Appl. No.: 17/903,079

(22) Filed: Sep. 6, 2022

(65) Prior Publication Data

US 2023/0084320 A1 Mar. 16, 2023

Related U.S. Application Data

(60) Provisional application No. 63/241,908, filed on Sep. 8, 2021.

(51) Int. Cl.
| | |
|---|---|
| *C09D 183/08* | (2006.01) |
| *B05D 3/04* | (2006.01) |
| *B05D 3/12* | (2006.01) |
| *B05D 7/00* | (2006.01) |
| *B05D 7/14* | (2006.01) |
| *C09D 5/00* | (2006.01) |
| *C09D 7/20* | (2018.01) |
| *C09D 127/18* | (2006.01) |
| *C09K 5/14* | (2006.01) |

(52) U.S. Cl.
CPC .......... *C09D 183/08* (2013.01); *B05D 3/044* (2013.01); *B05D 3/12* (2013.01); *B05D 7/148* (2013.01); *B05D 7/54* (2013.01); *C09D 5/002* (2013.01); *C09D 7/20* (2018.01); *C09D 127/18* (2013.01); *C09K 5/14* (2013.01)

(58) Field of Classification Search
None
See application file for complete search history.

(56) References Cited

U.S. PATENT DOCUMENTS

2010/0330380 A1* 12/2010 Colreavy ............... C08G 77/58
428/447

* cited by examiner

*Primary Examiner* — Sheeba Ahmed

(74) *Attorney, Agent, or Firm* — Jackson Walker LLP

(57) ABSTRACT

In an embodiment, the present disclosure pertains to a method of forming a self-assembled monolayer coating on a surface of a substrate. In general, the method includes polishing the substrate, cleaning the substrate, and creating a plurality of bonding sites on the surface of the substrate for head groups of an organofunctional silane molecule to bond. In some embodiments, the creating includes at least one of a liquid-phase chemistry process or a dry plasma chemistry process. In some embodiments, the method further includes coating the substrate with a silane coating solution. In some embodiments, the coating is performed in a controlled environment. In some embodiments, the controlled environment includes an anhydrous environment free of at least one of water or moisture. In a further embodiment, the present disclosure pertains to a heat transfer composition having a coating thereon applied via the methods of the present disclosure.

9 Claims, 12 Drawing Sheets

PROCESS TO SYNTHESIZE/INTEGRATE DURABLE/ROBUST LOW SURFACE ENERGY "HYDROPHOBIC" DROPWISE CONDENSATION PROMOTER COATINGS ON METAL AND METAL OXIDE SURFACES

CROSS-REFERENCE TO RELATED APPLICATIONS

This patent application claims priority from, and incorporates by reference the entire disclosure of, U.S. Application No. 63/241,908 filed on Sep. 8, 2021.

STATEMENT REGARDING FEDERALLY SPONSORED RESEARCH

This invention was made with government support under DE-EE0008605 awarded by the Department of Energy. The government has certain rights in the invention.

TECHNICAL FIELD

The present disclosure relates generally to condensation promoter coatings and more particularly, but not by way of limitation, to a process to synthesize/integrate durable/robust low surface energy "hydrophobic" dropwise condensation promoter coatings on metal oxide surfaces.

BACKGROUND

This section provides background information to facilitate a better understanding of the various aspects of the disclosure. It should be understood that the statements in this section of this document are to be read in this light, and not as admissions of prior art.

Low surface energy "hydrophobic" dropwise condensation promoter coatings on metal oxide surfaces fail rapidly during water vapor condensation on these surfaces. These coatings exist, and have existed for many years. However, they rapidly fail during water vapor condensation. This poor durability is the reason these coatings are not adopted in industrial applications and technologies, despite the major efficiency and operational cost benefits of leveraging the dropwise mode of condensation heat transfer, via these low surface energy "hydrophobic" coatings, over the prevalent filmwise mode of condensation heat transfer, which occurs on a higher surface energy material such as a metal oxide heat exchanger surface. As such, processes/procedures need to be developed in order to extend the lifetime of these organofunctional silane coatings, whether used by themselves as the dropwise condensation promoter coating or as an adhesion layer for an alternate thicker hydrophobic polymer coating (which acts as the dropwise condensation promoter coating).

Dropwise condensation is well known to result in better heat transfer performance owing to efficient condensate/droplet removal, which can be harnessed in various industrial heat/mass transfer applications such as power generation and conversion, water harvesting/desalination, and electronics thermal management. The key to enhancing condensation via the dropwise mode is thin low surface energy coatings (<100 nm) with low contact angle hysteresis. Ultrathin (<5 nm) silane self-assembled monolayers (or SAMs) have been widely studied to promote dropwise condensation due to their minimal thermal resistance and scalable integration processes. Such thin coatings typically degrade within an hour during condensation of water vapor.

After coating failure, water vapor condensation transitions to the inefficient filmwise mode with poor heat transfer performance. We enhance silane SAM quality and durability during water vapor condensation on copper compared to state-of-the-art silane coatings on metal surfaces. We achieve this via (i) surface polishing to sub-10 nm levels, (ii) pure oxygen plasma surface treatment, and (iii) silane coating integration with the copper substrate in an anhydrous/moisture-free environment. The resulting silane SAM has low contact angle hysteresis($\approx$20°) and promotes efficient dropwise condensation of water for >360 hours without any visible sign of coating failure/degradation in the absence of non-condensable gases. We further demonstrate enhanced heat transfer performance ($\approx$5-7×increase over filmwise condensation) over an extended period of time. Surface characterization data post-condensation leads us to propose that in the absence of non-condensable gases in the vapor environment, the silane SAM degrades due to reduction and subsequent dissolution of copper oxide at the oligomer-substrate interface. The experiments also indicate that the magnitude of surface subcooling (or condensation rate) affects the rate of coating degradation. This work identifies a pathway to durable dropwise promoter coatings that will enable efficient heat transfer in industrial applications.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure pertains to a method of forming a self-assembled monolayer coating on a surface of a substrate. In general, the method includes polishing the substrate, cleaning the substrate, creating a plurality of bonding sites on the surface of the substrate for head groups of an organofunctional silane molecule to bond. In some embodiments, the creating includes at least one of a liquid-phase chemistry process or a dry plasma chemistry process. In some embodiments, the method further includes coating the substrate with a silane coating solution. In some embodiments, the coating is performed in a controlled environment. In some embodiments, the controlled environment includes an anhydrous environment free of at least one of water or moisture.

In some embodiments, the method further includes modifying the surface, prior to the coating, via oxygen ($O_2$) plasma. In some embodiments, the method further includes flushing an $O_2$ plasma treating chamber with pure $O_2$ prior to the modifying. In some embodiments, the substrate includes copper (Cu), and the modifying results in growth of cupric oxide (CuO) and copper hydroxide ($Cu(OH)_2$). In some embodiments, the modifying results in optimal contact angle hysteresis (CAH) of CAH $\approx$20° for trichloro(1H,1H, 2H,2H-perfluorooctyl) silane (TFTS)-coated copper surfaces or CAH$\approx$30° for trichloro(octadecyl) silane (OTCS)-coated copper surfaces.

In some embodiments, the method further includes at least one of immersing the substrate into an anhydrous solvent or vacuum annealing to remove unbound silane molecules. In some embodiments, the solvent can include, without limitation, anhydrous hexane, cyclohexane, toluene, chloroform, chlorobenzene, and combinations thereof.

In some embodiments, the method further includes forming a second coating on the substrate. In some embodiments, the forming includes coating a coated layer of the substrate with a second coating solution. In some embodiments, the coating is performed in the controlled environment. In some embodiments, the forming further includes creating a second plurality of bonding sites on the coated layer for head groups of an organofunctional silane molecule, a self-assembled monolayer (SAM), a polymer-like coating, polytetrafluoro-ethylene (PTFE), or parylene to bond. In some embodiments, the creating includes at least one of a liquid-phase chemistry process or a dry plasma chemistry process.

In some embodiments, the coating results in a uniform assembly of silane molecules on the surface of the substrate. In some embodiments, the polishing results in the substrate having a root mean square (RMS) roughness (Rq) between 1 to 5 nm measured on a 20 μm×20 μm area. In some embodiments, RMS Rq is less than or equal to 3 nm measured on a 20 μm×20 μm area. In some embodiments, the substrate includes a metal such as, but not limited to, copper (Cu), tin (Sn), iron (Fe), aluminum (Al), silicon (Si), nickel (Ni), titanium (Ti), and stainless steel.

In some embodiments, the coating forms a dense and thin coating layer. In some embodiments, the coating has a density in a range of 70 to 100% coverage. In some embodiments, the coating has a thickness less than 200 nm. In some embodiments, the coating has a thickness less than 3 nm. In some embodiments, the coating has a thickness between 10 to 100 nm.

In some embodiments, the silane coating solution includes a mixture of silane and a solvent that can include, without limitation, an anhydrous hexane solvent, cyclo-hexane, toluene, chloroform, chlorobenzene, and combina-tions thereof. In some embodiments, the organofunctional silane molecule includes trichloro(1H,1H,2H,2H-perfluo-rooctyl) silane (TFTS) and trichloro(octadecyl) silane (OTCS).

In a further embodiment, the present disclosure pertains to a heat transfer composition or material having a coating thereon applied via the methods of the present disclosure.

In an additional embodiment, the present disclosure per-tains to a heat transfer composition or material having a substrate, a metal oxide layer on a surface of the substrate, and a coating on the metal oxide layer. In some embodi-ments, the coating includes organofunctional silane mol-ecules uniformly aligned on the metal oxide layer. In some embodiments the uniformly aligned arrangement has contact angle hysteresis of trichloro(octadecyl) silane (OTCS) on Si: $\theta_{adv}=102.7°±6.5°$, $\theta_{rec}=95.4°±5.1°$; trichloro(1H,1H,2H, 2H-perfluorooctyl) silane (TFTS) on Si: $\theta_{adv}=105.2°±5.0°$, $\theta_{rec}=95.0°±5.0°$; or TFTS on Cu: $\theta_{adv}=110.9°±6.4°$, $\theta_{rec}=90.6°±4.4°$.

In some embodiments, the substrate includes a metal such as, but not limited to, copper (Cu), tin (Sn), iron (Fe), aluminum (Al), silicon (Si), nickel (Ni), titanium (Ti), and stainless steel. In some embodiments, the coating has a density in a range of 70 to 100% coverage. In some embodiments, the coating has a thickness less than 200 nm. In some embodiments, the coating has less than 3 nm. In some embodiments, the coating has a thickness between 10 to 100 nm. In some embodiments, the organofunctional silane molecules include trichloro(1H,1H,2H,2H-perfluo-rooctyl) silane (TFTS) and trichloro(octadecyl) silane (OTCS). In some embodiments, the coating acts as an adhesion layer to form thicker polymer-like coatings or materials.

BRIEF DESCRIPTION OF THE DRAWINGS

A more complete understanding of the subject matter of the present disclosure may be obtained by reference to the following Detailed Description when taken in conjunction with the accompanying Drawings wherein:

FIG. 3 illustrates contact angles measurements on TFTS coatings prepared in a controlled and an ambient environ-ment with different plasma modification methods (i.e., oxy-gen plasma v/s no plasma treatment). OP and NP represent oxygen plasma and no plasma, respectively, while -C and -A represent the controlled condition and the ambient condi-tion, respectively, for the coating integration environment. The insets are advancing and receding angles for OP-C and NP-C samples. Plasma treatment and the self-assembled monolayer (SAM) coatings did not increase surface rough-ness (irrespective of coating environment).

FIG. 6 illustrates XPS carbon spectra for TFTS coatings deposited on polished copper substrates with 10 minutes pure oxygen plasma treatment (solid red line) and without plasma treatment (dashed blue line).

FIGS. 7a-7c illustrate heat flux, condensation heat trans-fer coefficients (HTC) for two dropwise experiments, with: FIG. 7a illustrating measurement of the condensation heat flux for two separate dropwise experiments at different vapor-to-substrate subcooling, and Nusselt model predic-tions, FIG. 7b illustrating calculated condensation HTCs for two dropwise experiments compared to the Nusselt model, and FIG. 7c illustrating calculated HTC over time at sub-coolings of ≈5.3° C. and ≈5.2° C. for dropwise experiments 1 and 2, respectively.

DETAILED DESCRIPTION

Figure 1A:
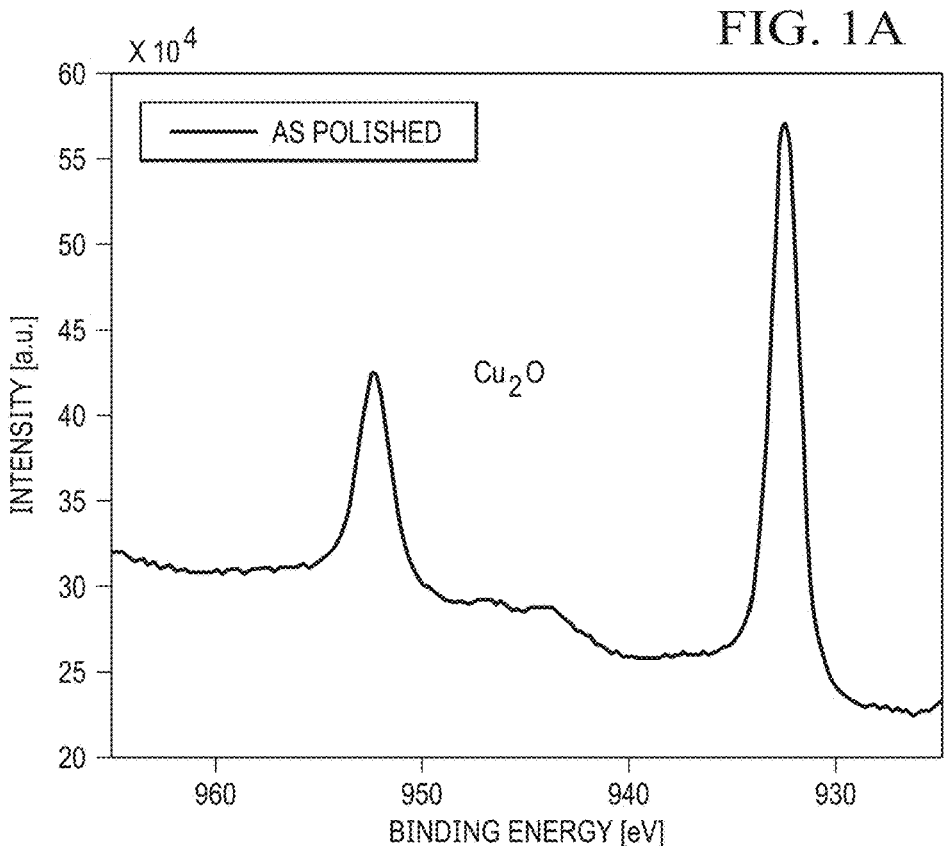
FIGS. 1a-1c illustrate X-ray photoelectron spectroscopy (XPS) copper peaks for (FIG. 1a) as polished copper sur-face, (FIG. 1B) oxidized copper surfaces by oxygen plasma modification (red) and air storage (green), and (FIG. 1c) chemically oxidized copper surface by hydrogen peroxide.

It is to be understood that the following disclosure pro-vides many different embodiments, or examples, for imple-menting different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Various aspects of the present disclosure pertain to a procedure that extends the lifetime of hydrophobic dropwise condensation promoter coatings for heat exchanger surfaces. Low surface energy "hydrophobic" dropwise condensation promoter coatings on metal oxide heat exchanger surfaces are used to enhance heat transfer performance by 3-7× compared to condenser surfaces without the dropwise promoter coating. However, these coatings fail rapidly during water vapor condensation. This poor durability is a reason they are not adopted in industrial applications such as, for example, power plants. To enable adoption of such coatings in industry, the coating lifetime needs to be enhanced. Disclosed herein are processes/procedures that help extend the lifetime of organofunctional silane dropwise promoter coatings. These coating processes/approaches may be used for silane monolayer coatings when they are used by themselves as the dropwise promoter coating, or as an adhesion layer for an alternate thicker hydrophobic polymer coating (which acts as the main dropwise condensation promoter coating).

Water vapor condensation is a ubiquitous process in industrial applications that span power generation and thermal energy management to water harvesting and desalination. Enhancing condensation heat/mass transfer performance leads to the largest relative improvement in cycle/system efficiency, reduced energy consumption, reduced harmful emissions, and compact heat exchangers. Water vapor condenses on typical metal or metal oxide heat transfer surfaces in either the filmwise mode or the dropwise mode. Dropwise condensation is nominally the more efficient mode as the condensate forms droplets that shed from the surface rapidly, creating fresh heat transfer area for new condensate nucleation events. There are predominantly three routes to enable efficient dropwise behavior: (i) low surface energy coatings that promote efficient droplet shedding facilitated by gravity, (ii) low surface energy coatings on optimized surface structures to promote droplet coalescence induced self-shedding via the jumping droplet mode, and (iii) slippery liquid-infused porous surfaces (SLIPS) or lubricant-infused surfaces (LIS) that leverage a textured condenser surface imbibed with an immiscible lubricant liquid to facilitate an extremely low contact angle hysteresis dropwise mode for efficient droplet shedding. Most of these dropwise promotion methods leverage low surface energy coatings, and are hence primarily applicable to condensing higher surface tension liquids such as water. Although SLIPS/LIS is capable of promoting dropwise behavior for lower surface tension liquids, lubricant depletion during condensation currently limits the application of this enhancement technique. The key challenge for enhanced dropwise condensation technologies and the bottleneck to industrial adoption is the durability of the low surface energy interface (i.e., the low surface energy material/coating) used to promote dropwise condensation. Due to the low thermal conductivity (<0.5 W/m·K) of most low surface energy coatings/materials, they have to be thin (<1 μm) to ensure high thermal conductance. These thin coatings are known to fail rapidly during water vapor condensation, however robustness/durability of coatings during water vapor condensation is an aspect that is rarely addressed in the literature. Some recent advances on thin and ultrathin (<5 nm) durable dropwise condensation promoters include (i) few layer graphene coatings on nickel that survive ≈3 years during water vapor condensation in the presence of non-condensable gases (NCGs), (ii) vitrimer coatings (<100 nm) that exhibit self-healing properties (also tested during water vapor condensation in the presence of NCGs), and (iii) grafted polymer coatings (≈40 nm) deposited by initiated chemical vapor deposition or iCVD demonstrating stable dropwise behavior and a heat transfer coefficient ≈37 kW/m2·K for ≈48 hours.

Thicker polymer coatings, such as polytetrafluoroethylene (PTFE), No-stik, silicone and parylene have been shown to achieve ;z0.4-8.6×factor change in heat transfer coefficient (HTC) relative to the filmwise mode, with lifetimes of promoting dropwise condensation from a few days to ≈2.5 years. Durability of these polymer coatings was highly dependent on the coating thickness, with durable thicker coatings decreasing the HTC. To improve the effective thermal conductance of thicker (and more durable) low surface energy polymer coatings, Wilke et al. infused PTFE into nanostructures of a higher thermal conductivity material to make a high thermal conductance thick (≈4 .5 μm) composite layer that achieved a large condensation HTC enhancement in the dropwise mode for over 200 days. Another method to address the thermal conductance constraint for dropwise promoter materials is to use ultra-thin promoter coatings such as self-assembled monolayers (SAMs) and graphene. SAM coatings (e.g., alkylsilanes and alkylthiols) have been primarily deposited on engineered nano/microstructures (i.e., micropillar arrays and porous metal oxides) to create superhydrophobic surfaces and promote the jumping droplet mode of condensation. Promoting dropwise condensation with silanes has been studied extensively since silanes are considered a more durable and chemically/thermally stable candidate compared to thiols. Despite the extensive literature studying the heat transfer benefits of silane SAMs as a dropwise promoter, there are only a handful of papers that report the durability of SAM coatings (and their dropwise behavior) during water vapor condensation. Paxson et al. reported that a trichloro(1H,1H, 2H,2H-perfluorooctyl)-silane (or TFTS) coating deposited on aluminum stopped promoting dropwise condensation after ≈30 minutes of condensing water vapor at 100° C. with a 30° C. subcooling. Preston et al. demonstrated that the same TFTS coating on a copper substrate also stopped promoting efficient dropwise condensation (i.e., condensation transitioned to a partial filmwise mode) after ≈30 minutes of water vapor condensation, and the condensation mode was completely filmwise ≈12 hours after the start of the experiment for a substrate subcooling of ≈5° C. Chang et al. demonstrated that an n-octadecyl mercaptan (octadecanethiol) SAM coated on a copper tube ceased to promote dropwise behavior after ≈2 days when condensing steam at 100° C. with a 20° C. substrate subcooling and in the presence of non-condensable gases (NCGs). It is important to note that the reported substrate subcooling when NCGs are present is an over prediction of the actual subcooling driving condensation. Vemuri et al. deposited n-octadecyl thiol on copper tubes and achieved over 2600 hours of DWC with varying subcooling from 1-4° C. This study observed a decrease in both static contact angle (from 148° to)111°) and HTC enhancement (from ≈3×to ≈1.8 ×) between 100 hours and 2600 hours, indicating that the coating degraded during water vapor condensation. The only other known study of SAM coating durability during water vapor condensation was reported by Blackman et al. They demonstrated good dropwise behavior for over 500 hours with 16 different alkyl chain compounds (including n-octadecyl thiol) coated on copper and copper alloy surfaces, however they did not report any heat transfer measurements. While these few studies explored the longevity of SAM coatings in promoting dropwise condensation, there is very little understood about the mechanism of SAM degradation during water vapor condensation.

Our recent work demonstrated how otherwise stable silane SAM coatings degrade during water vapor condensation, and we developed and validated coating-substrate integration procedures that extended the lifetime of silane SAMs on silicon substrates during water vapor condensation. We hypothesized that degradation of the silane SAM coating during active water vapor condensation on a silicon substrate begins at defect sites and propagates as the condensate (i.e., liquid water) dissolves the Si—O—Si siloxane bond that binds the silane to the silicon substrate. We also demonstrated that these defect sites (i.e., uncoated substrate regions) result from moisture/water in the coating environment which leads to hydrolysis of the silane molecules in the coating solution and polycondensation to form silane agglomerates and multilayer (not monolayer) silane coatings that are weakly bonded to the substrate through only few silane-substrate siloxane linkages. By controlling the coating environment to suppress water/moisture content, we minimized coating defect density, created monolayer silane coatings with a high density of silane-substrate siloxane bonds, and promoted perfect dropwise condensation (with low droplet departure diameters, a metric of enhanced condensation) for hundreds of hours. Our recent work with silicon substrates offered a new perspective on SAM coating degradation during water vapor condensation, however it is important to note that silicon-based heat exchangers are a niche application (e.g., vapor chambers for electronics or laser systems thermal management). In this work we explore degradation of silane SAM coatings on copper surfaces during water vapor condensation as copper is a widely used heat exchanger material in energy and water technologies, and improving the longevity of dropwise condensation on copper (and potentially other metals for which stable/meta-stable surface hydroxides can be created via appropriate plasma chemistry) will lead to enhanced efficiencies for these technologies. In this study, we leveraged our mechanistic understanding of water vapor condensation-mediated silane SAM degradation and pristine silane SAM coating synthesis to extend the lifetime of efficient dropwise condensation of water vapor on copper. Using molecular-to-macroscale surface and heat transfer characterization, we show that the key requirements for pristine TFTS SAM coatings on copper (and ultimately prolonged dropwise condensation) are: (i) ultra-smooth copper surfaces, (ii) surface functionalization in pure oxygen plasma, and (iii) coating integration in a water/moisture-free environment. Following these guidelines, we demonstrated that our plasma-engineered copper substrates with TFTS SAM coatings demonstrated low contact angle hysteresis ($\approx 20°$), higher condensation HTCs and improved durability compared to the state-of-the-art for TFTS SAMs. Among these criteria, oxygen plasma treatment and the coating environment have a bigger impact on durability and heat transfer performance for the timescales studied here. We additionally show that in the absence of NCGs during water vapor condensation, coating degradation occurs due to a reduction reaction at the SAM-substrate interface, and that surface subcooling and the rate of condensation heat transfer play an important role in determining the rate of coating degradation (or a transition to filmwise condensation). The new mechanistic understanding developed here for water vapor condensation-mediated degradation of TFTS SAM coatings on copper can be leveraged to further extend the lifetime of silane-based SAM coatings for enhanced condensation heat/mass transfer applications in energy and water technologies.

To develop the process/procedure, an understanding as to why these ultra-thin (<5 nm) organofunctional silane coatings fail during water vapor condensation heat transfer needs to be obtained. Leveraging this knowledge helps to develop coating integration/synthesis procedures that result in extremely high durability (during water vapor condensation) silane coatings on metal oxide surfaces as compared to traditional processes for silane coating synthesis/integration on similar metal oxide surfaces. The processes/approaches disclosed herein specifically control the environment in which the coating integration processes are performed to be free from moisture, and creates a large number of bonding sites for the head groups of the organofunctional silane molecule to bond (via hydroxyl surface functionalization using liquid-phase chemistry or dry plasma chemistry). These two factors are viable steps in integrating durable coatings on metal oxide surfaces having superior lifespans. Organofunctional silane-like monolayer coatings are often used as an adhesion layer between the metal oxide surface and thicker hydrophobic polymer (e.g., fluoro-polymers, parylene, etc.) coatings for dropwise condensation heat transfer applications. However, given that these thicker polymer coatings must still be "thin" (nominally <200 nm) to enhance heat transfer performance during condensation, they fail prematurely due to the presence of defects such as "pin-holes". The use of pristine quality silane adhesion layers—that are now possible through the procedures disclosed herein—help reduce the deleterious effects of these pin-hole defects in thicker polymer coatings, and ultimately extend the life of these polymer dropwise condensation promoter coatings.

Working Examples

Reference will now be made to more specific embodiments of the present disclosure and data that provides support for such embodiments. However, it should be noted that the disclosure below is for illustrative purposes only and is not intended to limit the scope of the claimed subject matter in any way.

Polishing and cleaning procedures. Polishing: A=$\approx$0.81 mm thick mirror-like finish 110 copper sheet (purity $\approx$99.9%, McMaster-Carr) was sheared into small square pieces (17 mm by 17 mm) and embedded in epoxy resin (EpoThin™ 2, Buehler) to facilitate uniform polishing across the surface. The samples were first polished in series by 400 grit, 1200 grit, 2500 grit and 4000 grit sandpapers. Then a mechanical polisher (LaboPol-5, Struers) was used to polish the samples with 1 μm and 0.5 μm polycrystalline diamond particle slurries (MetaDi Supreme, Buehler) on a synthetic fabric polishing cloth (MD-Floc, Struers), and finally buffed with a new/clean polishing cloth without any polishing liquid to remove excess particles on the surface. A root mean square (RMS) roughness (Rq) less than 3 nm was achieved eventually, and XPS scans indicate a cuprous oxide ($Cu_2O$) surface immediately after polishing.

Similarly, the copper tubes were polished with the various sandpapers first, and then mounted and polished on a lathe with the polishing slurry sprayed on them. To avoid physical damage to the polished surfaces during the sample transport and the condensation setup assembly, the Swagelok® tube fittings were tightened on the copper tube before polishing and were kept on tightly during the coating synthesis and the plasma treatment.

Cleaning: The samples were further cleaned in methanol sonication bath, rinsed with deionized (DI) water, and dried with 99.99% pure nitrogen to remove the particles from polishing and minimize potential contamination (e.g., hydrocarbon or water vapor in the atmosphere) of surfaces. The chemically oxidized samples were first cleaned with methanol and DI water, immersed in 30 wt. % hydrogen peroxide solution, and finally rinsed with DI water and dried with pure nitrogen. The container for hydrogen peroxide solution was shaken gently during chemical oxidation to avoid forming bubbles on the samples. Glassware, including crystalizing dishes for the coating solution and the petri dishes used to transfer/store samples, were all cleaned with piranha solution (sulfuric acid, 95-98% and hydrogen peroxide, 30 wt. % in water, ratio 3:1) and rinsed multiple times with pure DI water. After drying in a forced convection oven at 70° C. for at least 1 hour, the glassware were further cleaned by argon (Ar) plasma at 75 W for 30 minutes (EM-KLEEN, PIE Scientific LLC).

Plasma modification and coating procedure. Oxygen plasma modification: The samples were modified by oxygen ($O_2$) plasma (Tergio, PIE Scientific LLC) to grow cupric oxide (CuO) and copper hydroxide (Cu(OH)$_2$). The chamber was first pumped down to ≈66.7 Pa, flushed with pure oxygen gas, and then pumped down again to ≈6.7 Pa. The oxygen flushing step removed any excess air in the system and guaranteed a pure oxygen environment before plasma activation. Oxygen plasma was activated in the chamber with a constant oxygen flow rate (≈5.0 sccm, operating chamber pressure ≈20.0 Pa) at 75 W for 10 minutes. This $O_2$ plasma treatment time was determined to result in an optimal contact angle hysteresis after TFTS coating.

Coating procedures in the controlled (dry) environment and the uncontrolled (ambient) environment were performed in a nitrogen glovebox (UNILab pro SP, MBraun, H$_2$O<0.1 ppm, $O_2$<0.1 ppm) and a fume hood, respectively, with anhydrous chemicals. After the standard cleaning procedures mentioned above, all glassware and tools were first rinsed with anhydrous hexane two times before using them. The silane coating solution (1 mMol/L) was prepared by adding the silane to the anhydrous hexane solvent and heating up the solution to 60° C. The samples were then immersed into the solution and maintained at 60° C. for 1 hour. This temperature is sufficiently high to accelerate silane dissolution, but lower than the boiling point of hexane to avoid any loss of the solvent. The long immersion time ensures uniform assembly of silane molecules onto the surface. The silane-coated samples were immersed into multiple baths of anhydrous hexane to remove unbonded silane molecules, and eventually annealed in a vacuum oven (P<1 kPa) at 100° C. for 1 hour to evaporate any excess adsorbed silane molecules on the surface. For the coating deposited in the ambient condition, the silane solution was made in the glovebox with anhydrous hexane, and was only transferred out to the fume hood before the start of the coating procedure to minimize any moisture in the solution.

Surface/material characterization. All AFM measurements were performed in ambient laboratory conditions by scanning 20 μm by 20 μm areas at a scan rate of 0.5 Hz and 256 lines per scan. All AFM roughness results reported are based on scanning at least 3 different locations on each sample. XPS measurements were typically conducted within one hour for uncoated samples (i.e., after polishing, chemical oxidation and/or plasma treatment), to minimize airborne contaminations. For the coated samples, XPS analyses were conducted 3 days after the samples were prepared or removed from the condensation experiment, to enable other characterizations (e.g., contact angle measurements and AFM) which needed to be performed prior to XPS measurements. XPS results were analyzed with CasaXPS to fit various peaks for each element and calculate the atomic ratios. In an oxygen XPS spectrum, the metal oxides, the metal carbonates and the metal hydroxides peaks have their corresponding ranges of binding energies at 528.0-531.0 eV, 530.5-531.5 eV, and 530.9-532.0 eV, respectively. The advancing and receding contact angles were determined based on measurements at 3 different locations on each sample, and each measurement was calculated from 121 frames of digitized droplet-air and droplet-substrate interfaces. Left and right contact angles were treated as separate droplets, since the advancing (and receding) did not necessarily occur at the same time for both the left- and right-side contact points. More details on the surface/material characterization with AFM, XPS and contact angle measurements (CAM) may be found in our prior published work.

Coating procedures: Coating procedures in the controlled (dry) environment and the uncontrolled (ambient) environment were performed in a nitrogen glovebox (UNILab pro SP, MBraun, H$_2$O<0.1 ppm, $O_2$<0.1 ppm) and a fume hood, respectively, with anhydrous chemicals. After the standard cleaning procedures mentioned above, all glassware and tools were first rinsed with anhydrous hexane solvent two times before using them. The silane coating solution (1 mMol/L) was prepared by adding the silane to the anhydrous hexane solvent and heating up the solution to 60° C. The samples were then immersed into the solution and maintained at 60° C. for 1 hour. This temperature is sufficiently high to accelerate silane dissolution, but lower than the boiling point of hexane to avoid any loss of the solvent. The long immersion time ensures uniform assembly of silane molecules onto the surface. The silane-coated samples were immersed into multiple baths of anhydrous hexane to remove unbounded silane molecules, and eventually annealed in a vacuum oven (P<1 kPa) at 100° C. for 1 hour to evaporate any excess adsorbed silane molecules on the surface. For the coating deposited in the ambient condition, the silane solution was made in the glovebox with anhydrous hexane, and was only transferred out to the fume hood before the start of the coating procedure to minimize any moisture in the solution. The current coating procedures followed were previously reported, and guarantee conformal SAM coatings with minimal coating defects and favorably low contact angle hysteresis. This coating procedure may be repeated multiple times (after annealing) to get obtain higher density coatings, however, a single coating procedure may be sufficient to significantly enhance the durability.

Atomic force microscopy (AFM). Topography: The surface topography and roughness were measured with AFM (Dimension Icon AFM, Bruker) in the tapping mode to minimize the physical damage to the samples (compared to the contact mode) and eliminate the ambient interference (e.g., humidity/moisture). A cone shape AFM cantilever (HQ:NSC35/A1 BS) was used for topography scanning. The tip radius is less than 8 nm; the resonance frequencies from 150 kHz to 300 kHz; and the spring constants from 5.4 N/m to 16 N/m (for 3 different tips on one cantilever).

Adhesion force: The adhesion forces were characterized with the same AFM in the peak force QNM (quantitative nanomechanics) mode. This mode directly controls the maximum peak normal force and minimizes the lateral forces on the probe. A rectangular AFM cantilever (RTESPA-150) was used for adhesion measurements. The tip radius is less than 8 nm; the resonance frequency is 150 kHz; and the spring constant is 5 N/m. The adhesion force measurements are highly dependent on the probe deflection sensitivity calibration which is affected by laser position on the cantilever and the prevailing environmental conditions such as humidity and temperature. For example, the calibration sensitivity obtained for three different calibrations are 84.62±0.51 nm/V, 73.67±0.35 nm/V and 69.15±0.02 nm/V, with the same peak force set point. Given this large variation in the sensitivity calibration, the reported adhesion forces were obtained on the same date to ensure the consistency. Therefore, the measured adhesion forces are relative values instead of absolute values.

Topography images and adhesion images were obtained by scanning 20 μm by 20 μm (to capture more surface structures) areas and 2 μm by 2 μm areas (limited by the peak force QNM mode), respectively. All measurements were performed in ambient laboratory condition at a scan rate of 0.5 Hz and 256 lines per scan, and the images were analyzed with NanoScope Analysis 1.9 to calculate the root mean square (RMS) roughness (Rq) and the average adhesion forces. AFM results reported were based on scanning at least 3 different locations on each sample.

X-ray photoelectron spectroscopy (XPS). An Omicron XPS system with its DAR 400 dual Mg/Al X-ray source was utilized to identify the materials (e.g., CuO or $Cu_2O$) and chemical bonds (e.g., metal oxide and metal hydroxide), and measure the elemental compositions at the sample surface. XPS measurements were performed at a take-off angle of 40.05°, and at an analysis chamber pressure of 1.33E-6 Pa. The emission current is 20 mA for the X-ray and the anode voltage is 15 kV, resulting in a total 300 W X-ray power. The constant analyzer energy (CAE) was set to be 20 eV for carbon and silicon, and 50 eV for copper, oxygen and fluorine. The dwell time was 0.1 s for copper, silicon and fluorine, and was adjusted to be 0.15 s for carbon and oxygen to improve the signal-to-noise ratio (S/N) given the low amount of carbon on clean copper surfaces. To reduce the charging on the sample, a CN10 charge neutralizer has an emission current of 10 μA and a beam energy of 2 eV. XPS measurements were typically conducted within one hour for the uncoated samples after preparation (i.e., polishing, chemical oxidation and plasma treatment) in order to minimize airborne contaminations; while for the coated samples, XPS were conducted 3 days after the samples were prepared or removed from the condensation experiment to enable other characterizations (e.g., CAM, AFM) which needed to be performed prior to XPS measurements. XPS results were analyzed with CasaXPS to fit various peaks for each element and calculate the atomic ratios. In an oxygen XPS spectrum, the metal oxides, the metal carbonates and the metal hydroxides peaks have the corresponding ranges of binding energies at 528.0 eV~531.0 eV, 530.5 eV~531.5 eV, and 530.9 eV~532.0 eV, respectively.

Contact angle measurement (CAM). The contact angles were measured using a customized goniometry setup including a syringe pump (NE-1010, New Era Pump Systems, Inc.), a dual-axis goniometer stage (accuracy),-=0.1°, and a camera (EOS 80D, Canon) with a macro lens (MP-E 65 mm, Canon). Videos were recorded at 60 Hz during water infusion and withdrawal through a gauge 30 needle (≈0.312 mm outer diameter) at a flow rate ≈50 μL per minute to characterize the advancing and receding angles, respectively. In order to minimize the effect of gravity, the droplet diameter was maintained less than the capillary length of water (i.e., 2.7 mm). The droplet interfaces were extracted and digitized for 121 frames (i.e., 2 seconds) for each video, and vector parametrized splines were fitted over the digitized profiles to calculate the contact angles for all frames. The advancing and receding contact angles were determined based on measurements of 3 different locations on each sample. Left and right contact angles were treated as separate droplets, since the advancing (and receding) did not necessarily occur at the same time for both the left- and right-side contact points.

Durability testing during water vapor condensation. Water vapor condensation heat transfer experiments were conducted in a vacuum-capable environmental chamber with a measured leak rate less than 1.5 Pa/hr. An aluminum cold plate heat sink insulated with Kapton polyimide plastic was used to mount the test samples with carbon tape. Coolant water was supplied by a chiller (K6, Applied Thermal Control) through the cold plate to cool down the sample surfaces. Stainless steel probe thermocouples (SCPSS-062U-SHX, Omega Engineering) were used to measure the temperature at various locations inside the chamber (i.e., vapor, sample surface, cold plate inlet and outlet, etc.). Chamber pressure was measured with a Baratron® capacitance manometer (628F13TBE2B, MKS Instruments) and a Micro Pirani pressure transducer (925, MKS Instruments). Water was degassed and maintained in the degassed state in a high vacuum sealed boiler. Degassing was performed by first heating up the boiler to 100° C. with a vent valve open to atmosphere, kept the boiling state for ≈30 seconds, and subsequently pulled vacuum on the boiler vapor space for ≈30 seconds with the vent valve closed. The vapor pressure in the boiler after degassing matched the saturation pressure of the liquid/vapor water temperature.

Before starting each condensation test, the chamber was first evacuated to high vacuum (P<$10^{-3}$ Pa) with coolant water supplying to the cold plate at 40° C. The coolant volumetric flow rate was maintained at 3.1 L/min and measured by a liquid flow meter (L-5LPM-D/5V, Alicat Sci.) in the return line to the chiller. Degassed water was then introduced into the chamber at 100° C. for 30 mins in order to add sufficient water (600 mL) in the system acting as the vapor source after closing the vapor line. Steady state (i.e., sample surface temperature did not vary by more than ≈0.2° C. and the saturation pressure did not vary by more than ≈0.2 kPa) was reached within 1.5 hrs. The system temperature was controlled via PID controllers connected to multiple ultra-thin polyimide heaters and wire heaters attached to the chamber body, viewports, door, and chamber stand/base. For the experiment with samples at different roughness levels, the vapor and substrate temperatures at steady state were ≈53.9° C. and ≈48.0° C., respectively (i.e., subcooling ≈5.9° C.); while for the testing of samples prepared in different conditions and modification methods, the vapor and substrate temperatures were slightly different (≈47.8° C. and ≈46.3° C.) due to a larger amount of vapor/condensate introduced into the system at the beginning of the test, although all experimental settings were kept the same.

Figure 1B:
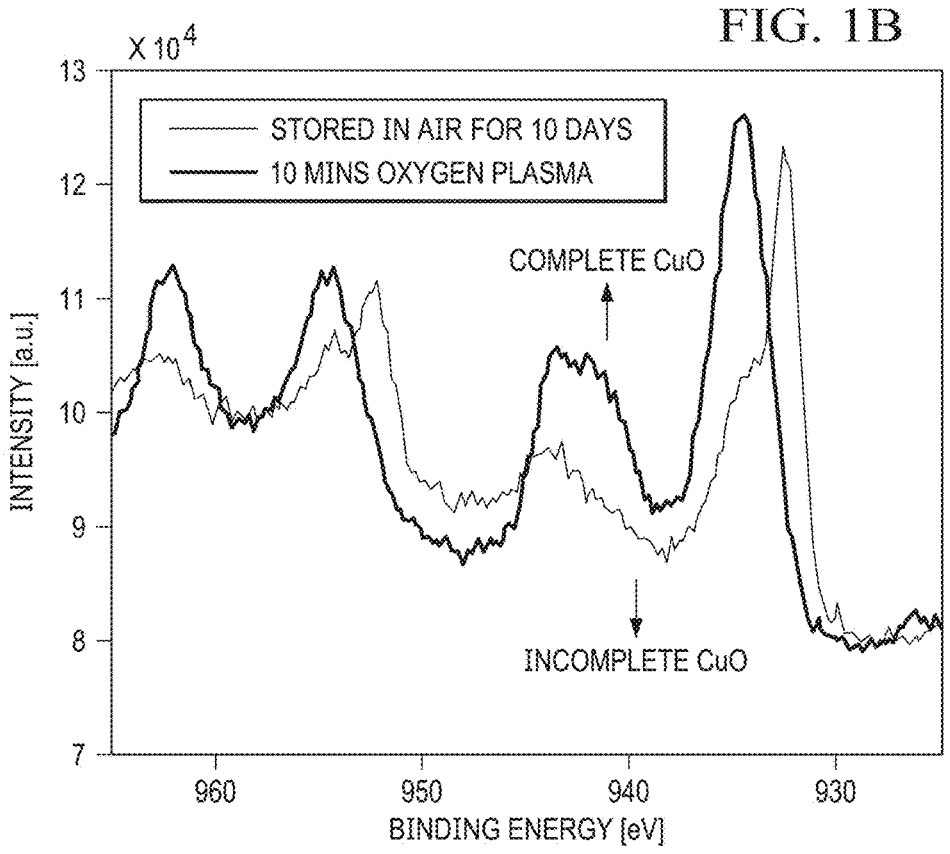

Surface chemistry of plasma modification. X-ray photoelectron spectroscopy (XPS) scans were first performed on the polished copper surface immediately after polishing (<30 minutes), and the copper XPS profile (FIG. 1a) indicates a cuprous oxide ($Cu_2O$) surface with a $Cu2p_{3/2}$ peak at 932.4 eV, a $Cu2p_{1/2}$ peak at 952.3 eV, and a weak satellite peak in between. When treated by a low pressure (≈6.5 kPa) oxygen plasma for 10 minutes, the polished surface is oxidized to cupric oxide (CuO) with a $Cu2p_{3/2}$ peak at 934.5 eV, a $Cu2p_{1/2}$ peak at 954.3 eV, and two satellite peaks. This profile (FIG. 1B) and the equivalent intensities of the $Cu2p_{1/2}$ peak and its corresponding satellite peak at 962.0 eV confirm a complete CuO surface. Oxidation of copper surfaces would also occur gradually in ambient conditions in air (FIG. 1B shows the XPS profile for an air-oxidized CuO surface). The $Cu2p_{3/2}$ peak at 932.5 eV and the $Cu2p_{1/2}$ peak at 952.2 eV each with small satellite peaks to their left indicate the transition from $Cu_2O$ to CuO (i.e., shifting towards higher binding energy and closer to a CuO profile).

Figure 1C:
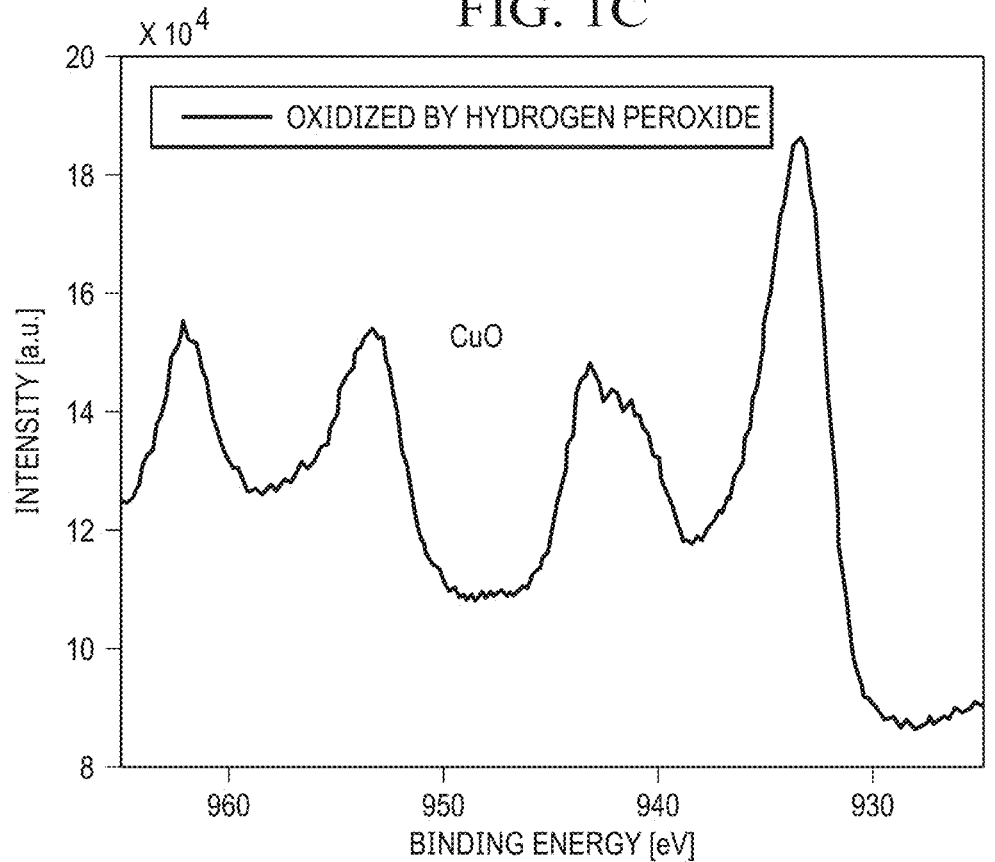
Figures 2A, 2B:
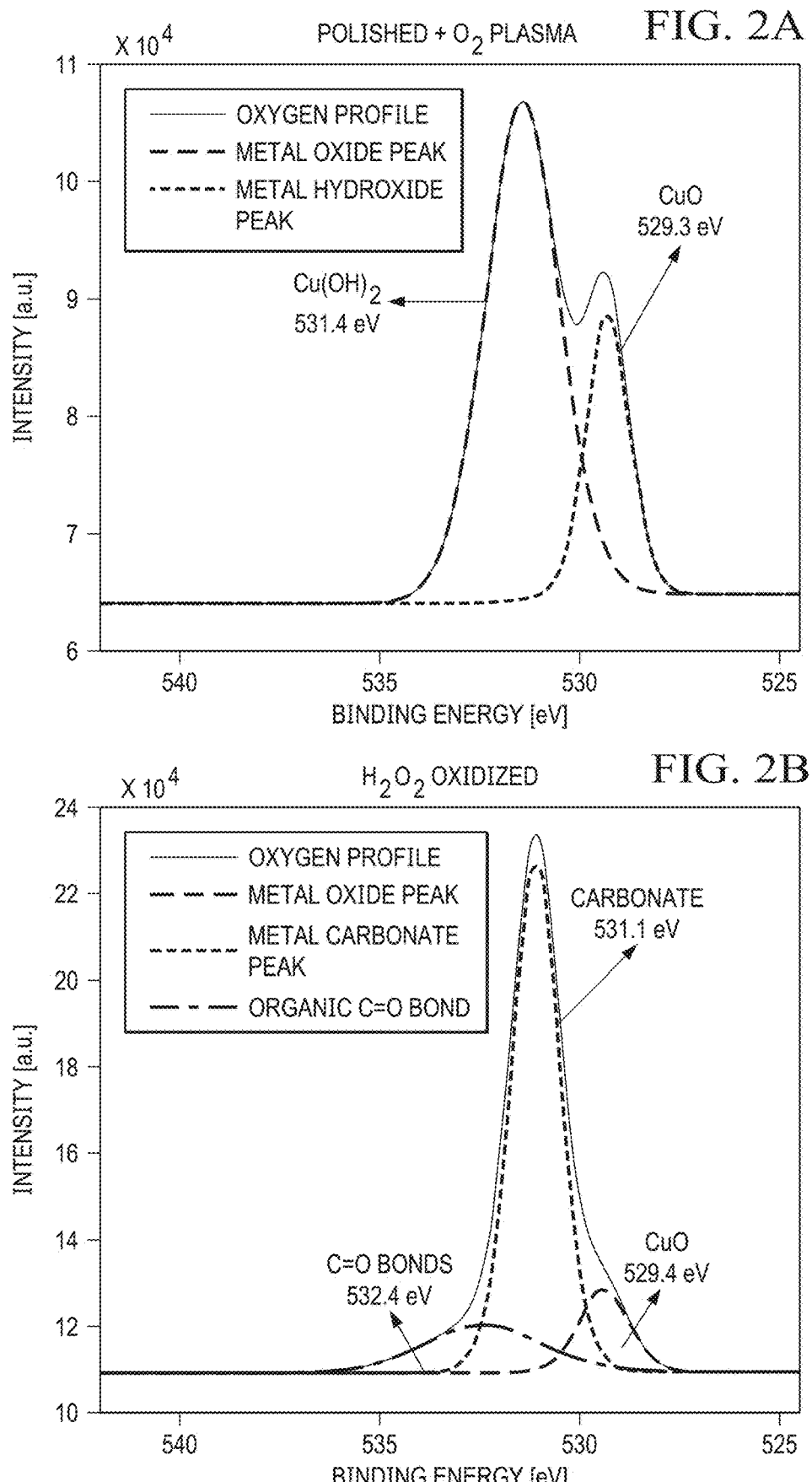
FIGS. 2a-2c illustrate XPS oxygen peaks for (FIG. 2a) a polished surface immediately treated with oxygen plasma for 10 minutes, (FIG. 2b) a polished surface oxidized in hydrogen peroxide solution for 15 minutes, and (FIG. 2c) a surface first oxidized by hydrogen peroxide for 15 minutes and subsequently treated with oxygen plasma for 10 min-utes.
Figure 2C:
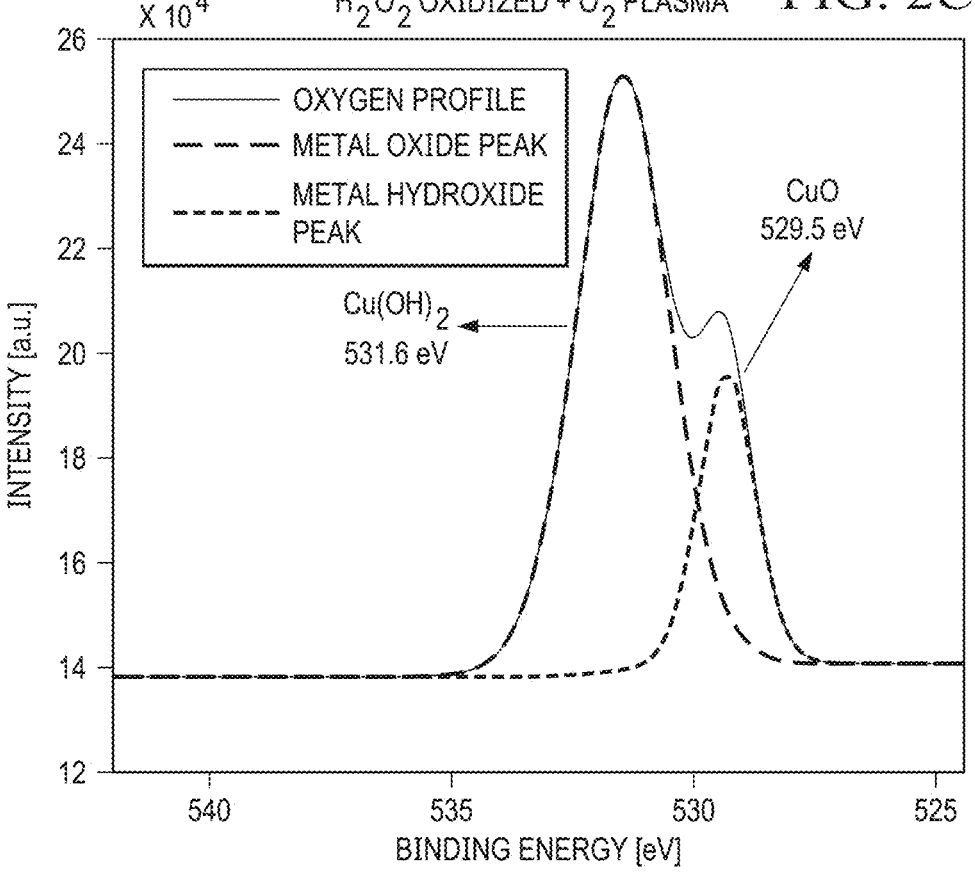

Copper surfaces can also be chemically oxidized in hydrogen peroxide ($H_2O_2$) solution, resulting in a complete CuO profile (FIG. 1c) which is equivalent to that of a surface oxidized by oxygen plasma. The key difference between a copper surface oxidized by $O_2$ plasma and one oxidized in $H_2O_2$ solution is a metal oxide peak (i.e., CuO at 529.3 eV) and a metal hydroxide peak (i.e., $Cu(OH)_2$ at 531.4 eV) for the former as shown in FIG. 2a, and a metal oxide peak at 529.4 eV, a metal carbonate peak (i.e., $CuCO_3$ at 531.1 eV) and a weak organic peak (i.e., C=O bonds at 532.4 eV) for the latter as shown in FIG. 2b. The peak for organic C=O bonds most likely results from dissolved carbon dioxide and airborne carbonates in the hydrogen peroxide solution. By treating the $H_2O_2$ oxidized copper surface with a low-pressure oxygen plasma ($\approx$10 minutes), the metal carbonate and organic C=O bonds peaks are suppressed, and the metal oxide (at 529.3 eV) and metal hydroxide (at 531.6 eV) peaks typically seen after an $O_2$ plasma treatment, are recovered (FIG. 2c). Interestingly, the various copper surfaces treated by $O_2$ plasma for 10 minutes, either directly after surface polishing or with an intermediate $H_2O_2$ solution oxidization step, have a constant area ratio of hydroxide to oxide around 72:28%. A surface metal hydroxide is favorable for uniform silane SAM formation since the silane molecules bond to hydroxyl groups (-OH) on the substrate. Therefore, substrates modified by oxygen plasma are expected to exhibit better SAM coating quality.

Effect of plasma modification on coating quality. To study the effect of plasma modification on silane coating quality and subsequent durability during water vapor condensation, trichloro(1H,1H,2H,2H-perfluorooctyl) silane (or TFTS) was coated on (i) a polished copper surface without an intermediate $O_2$ plasma treatment step and (ii) a polished ($\approx$18.1°) with advancing and receding contact angles being 106.9°±5.8° and 88.8°±6.5°. This contact angle hysteresis is as low as achieved for TFTS deposited on an ultra-smooth silicon surface. The average adhesion force of the plasma-modified TFTS coating on polished copper is 15.4 nN. Note, the measured adhesion forces are relative values instead of an absolute value since the calibration of the cantilever deflection sensitivity highly depends on the environmental conditions (e.g., humidity and temperature) and the laser position on the cantilever. Therefore, both adhesion measurements were performed on the same day with the same calibration to ensure consistency and a fair comparison for both samples.

Effects of surface roughness, coating environment and oxygen plasma treatment. Surface roughness is known to affect silane SAM coating quality, which may also may also affect coating durability during water vapor condensation. Hence the effect of substrate roughness on coating durability during water vapor condensation was also studied. Copper substrates were prepared at four different roughness levels. Samples polished by 400 grit sandpaper and 1200 grit sandpaper, oxidized by $H_2O_2$ solution and mechanically polished with a 0.5 µm polishing slurry had a root mean square (RMS) roughness (or Rq, obtained by AFM with scan size 20 µm by 20 µm) of 420 nm, 232 nm, 23 nm and 2.70 nm, respectively. All four samples were modified by oxygen plasma for 10 minutes and then coated with TFTS in a controlled environment. 10 mins oxygen plasma treatment was adopted in the following experiments for the purpose of making a consistent comparison against what previously reported in literature. The smoothest substrate exhibited a favorably low contact angle hysteresis ($\approx$20.3°) for TFTS, while the other three samples all have contact angle hysteresis greater than 40° (data summarized in Table 1). The lower contact angle hysteresis is more favorable for heat transfer applications, since the faster droplet shedding increases the droplet nucleation rate, resulting in a higher condensation heat transfer coefficient.

TABLE 1

Surface characterization results for TFTS coated on substrates at different roughness levels pre ($\approx$0 hours) and post ($\approx$360 hours) water vapor condensation. The samples were treated by oxygen plasma for 10 minutes, and the coating synthesis was performed in a controlled/anhydrous environment.

Figure 3:
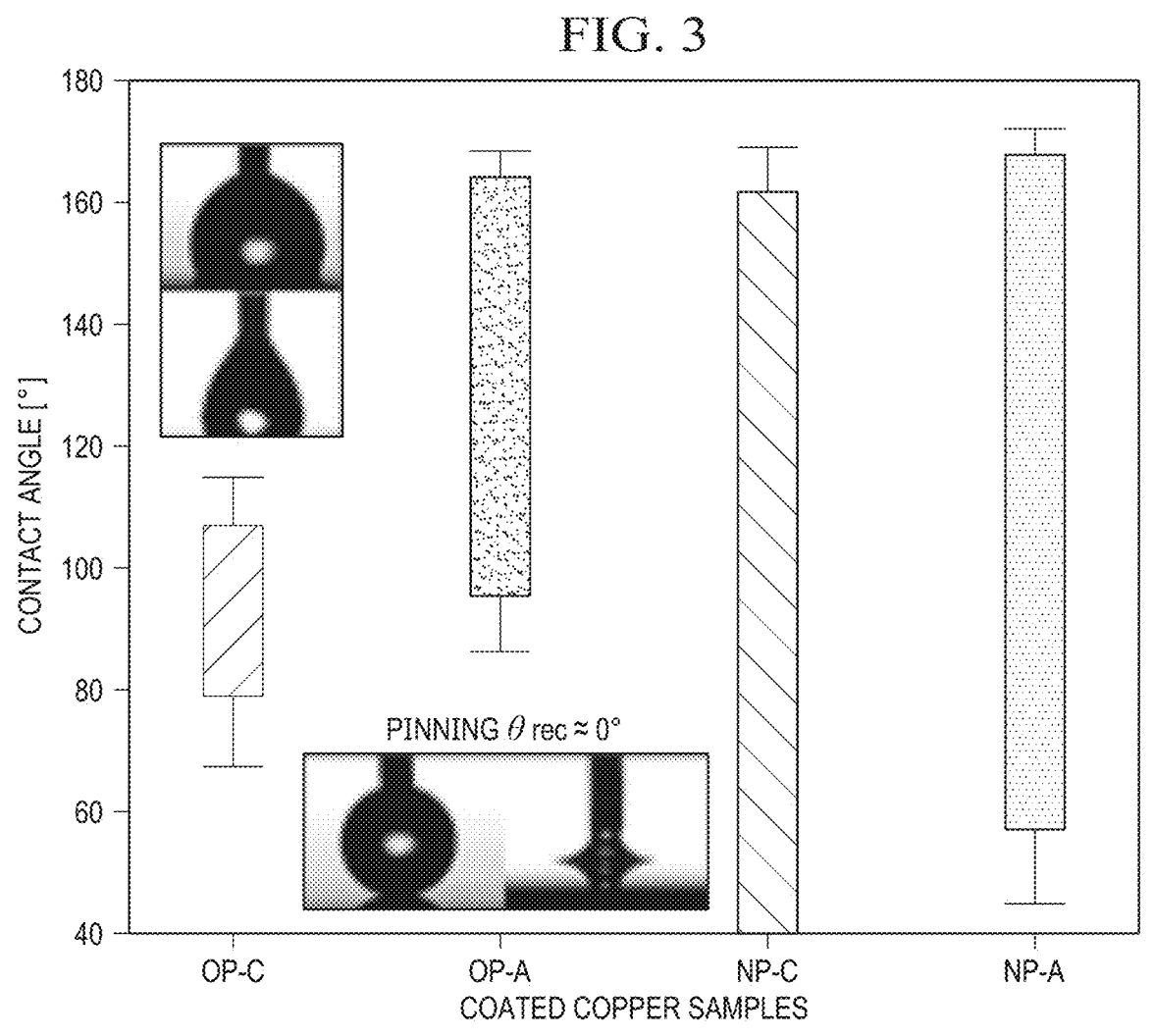

| Sample Name | $O_2$ Plasma | Enviroment | Measurement | Rq (nm) | CAM (°) Adv | Std | Rec | Std | CAH |
|---|---|---|---|---|---|---|---|---|---|
| 400 Grit | Yes | Controlled | Pre | 420 | 129.1 | 6.8 | 73.3 | 5.3 | 55.8 |
| | | | Post | 404 | 117.0 | 4.58 | 28.4 | 8.7 | 88.6 |
| 1200 Grit | Yes | Controlled | Pre | 232 | 126.4 | 11.5 | 82.6 | 10.3 | 43.8 |
| | | | Post | 165 | 109.2 | 7.2 | 28.3 | 8.4 | 80.9 |
| Chem Oxd. | Yes | Controlled | Pre | 23.0 | 129.9 | 7.0 | 74.5 | 6.4 | 54.4 |
| | | | Post | 49.0 | 98.8 | 8.7 | 12.7 | 3.7 | 86.1 |
| Mech. Pol. | Yes | Controlled | Pre | 2.70 | 110.9 | 6.4 | 90.6 | 4.4 | 20.3 |
| | | | Post | 36.8 | 106.8 | 7.6 | 14.3 | 6.4 | 92.5 | copper surface first treated with $O_2$ plasma for 10 minutes. Silane integration on the copper substrates was primarily done in a controlled environment (unless specified otherwise) using procedures previously reported. For TFTS deposited on polished copper, the advancing and receding contact angles are 121.6°±6.2° and 64.1°±6.5°, respectively, and the average adhesion force obtained by atomic force microscopy (AFM) is 3.9 nN. Comparatively, the polished copper surface when treated with an $O_2$ plasma just prior to TFTS coating exhibits a much lower contact angle hysteresis Prior research has shown that a controlled/anhydrous environment is useful in creating robust silane SAM coatings during water vapor condensation on silicon substrates. Performing silane SAM synthesis in an ambient environment with moisture leads to uncoated substrate regions (i.e., defects) resulting from (i) silane agglomerates (or multilayers) caused by cross-linking of silane molecules and/or (ii) preferential wetting of water/moisture on the silicon surface. These defects expand during condensation, leading to the degradation of silane SAM coatings. Here, the roles of the coating environment and oxygen plasma modification on coating durability during water vapor condensation were investigated. TFTS on plasma-treated copper surfaces and surfaces not treated by oxygen plasma in both a controlled (i.e., nitrogen glovebox) and an ambient environment (i.e., fume hood) were integrated. All substrates were oxidized by $H_2O_2$ solution prior to plasma treatment and/or TFTS coating synthesis to ensure that the RMS roughness for the underlying substrate is uniform (Rq≈23 nm) for all samples. As shown in FIG. 3, the sample treated by oxygen plasma and coated in the controlled environment (i.e., OP-C) exhibited a relatively lower contact angle hysteresis ≈28.3°. Conversely, the sample treated by oxygen plasma and synthesized in ambient condition (i.e., OP-A) had a very large advancing angle ≈164.4° and a larger hysteresis ≈69.0°, with the receding angle above 90°. For substrates not treated with oxygen plasma (i.e., NP-C and NP-A), however, the droplets advance on the surface in the Cassie-Baxter state with the advancing angles above 160°, and the hysteresis are greater than 110°. Note, the droplet pinned on the NP-C surface with a receding angle ≈0°. These results indicate that coatings integrated in a controlled environment on plasma-treated copper are a more promising coating to promote dropwise condensation over an extended period.

Figure 5A:
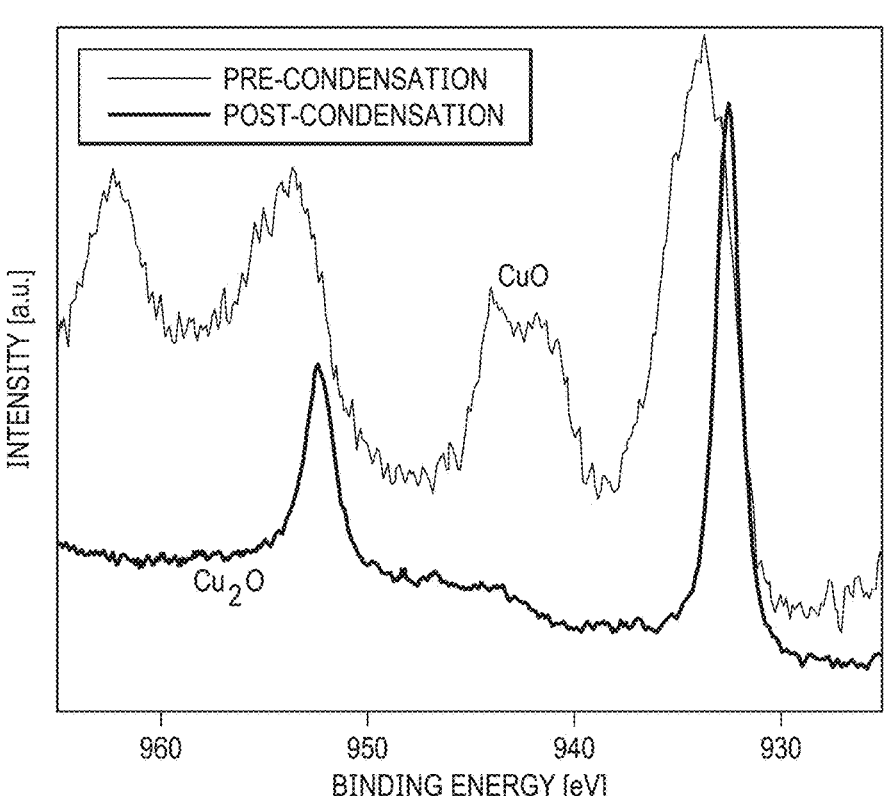
FIGS. 5a-5d illustrate XPS scans (copper and carbon) after ≈360 hours of water vapor condensation for (FIG. 5a and FIG. 5b) sample modified by oxygen plasma and coated in the controlled condition (i.e., OP-C), and (FIGS. 5c and 5d) sample coated in the controlled condition without plasma treatment (i.e., NP-C). The AFM scan size is 20 μm by 20 μm, and the insets are the corresponding representa-tive images for a receding droplet. The gray lines in the XPS plots represent the results obtained before the water vapor condensation testing.
Figure 5B:
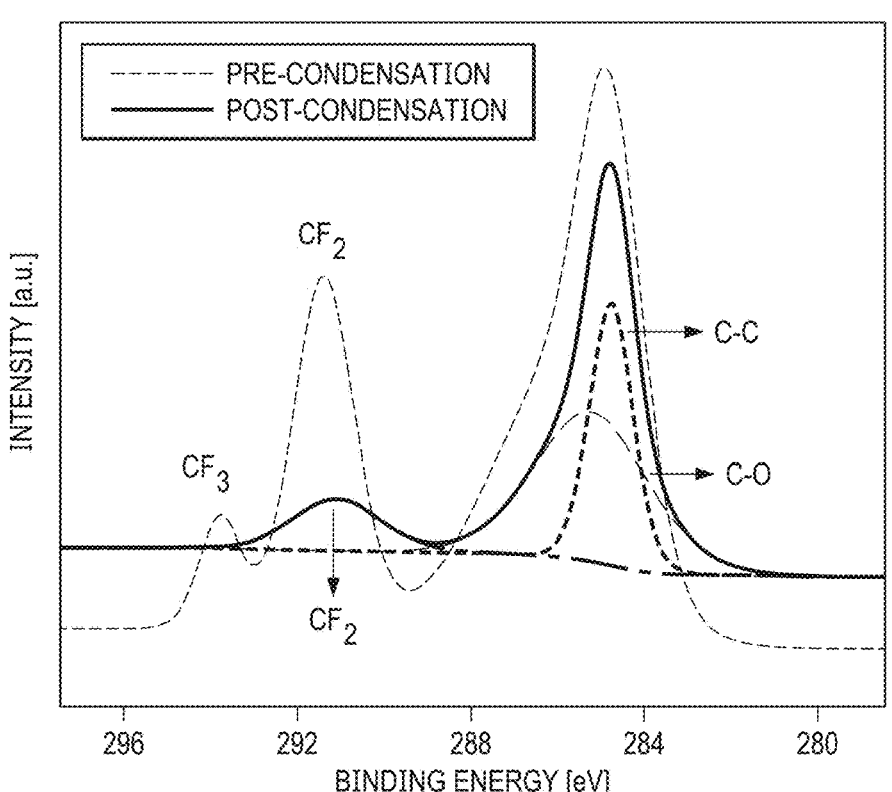

The TFTS SAM coating was also deposited on a polished and oxygen plasma-modified copper tube to precisely characterize heat transfer during water vapor condensation. The length, outer diameter (OD) and wall thickness of the copper tube were ≈15 cm, 6.35 mm, and 0.89 mm, respectively. The surface Rq after polishing was 7.98 nm (20 μm by 20 μm scan area) obtained by AFM (FIG. 5b). The polishing procedure is in the Methods section.

Condensation heat transfer durability testing. Water vapor condensation heat transfer experiments were performed for copper samples with different roughness levels that were all treated by oxygen plasma and coated with TFTS in a controlled environment. Condensation experiments were performed in a pure and saturated water vapor environment with the vapor temperature around 53.9° C. (standard deviation ≈2.5° C.).

The tests were stopped before complete coating failure was achieved (i.e., up to ≈360 hours, or 15 days were only tested) in order to avoid a binary pass/fail result (complete removal of the coating) and to facilitate meaningful surface characterization (e.g., surface roughness and contact angles) post water vapor condensation. The four samples at different roughness levels demonstrated partial filmwise condensation to varying degrees after condensing water vapor for ≈360 hours. Coating failure was defined either as regions of the sample which exhibit a transition from DWC to FWC, or the presence of large pinned droplets. The substrates polished by 400 grit sandpaper and 1200 grit sandpaper maintained small droplet diameters in the first 24 hours, and started to fail from the edge after 190 hours, when the contact angles were noticeably decreased. Droplet pinning regions also increased over time. Partial failures were observed around ≈94 hours and ≈24 hours for the $H_2O_2$ oxidized surface and the mechanically polished surface, respectively. This early failure on the smoother surfaces was attributed to faster droplet shedding with lower contact angle hysteresis. Faster nucleation and shedding drives more water vapor to the surface, resulting in a higher heat transfer rate and a larger quantity of pure water interacting with the coating/substrate and potentially leading to faster coating degradation. It is interesting to note that the failure regions on these smoother surface samples do not propagate (i.e., increase in size) significantly up to the termination of the experiment at ≈360 hours, which is contrary to the rougher surface samples that progressively failed. Additionally, the droplet departure diameters are relatively smaller on the smoother surfaces, and the ascending trends of the droplet sizes were observed on the sandpaper polished samples, suggesting that the rough surfaces were undergoing severe degradation. These are indicative of the higher quality coatings achieved on smoother surfaces.

Figure 7A:
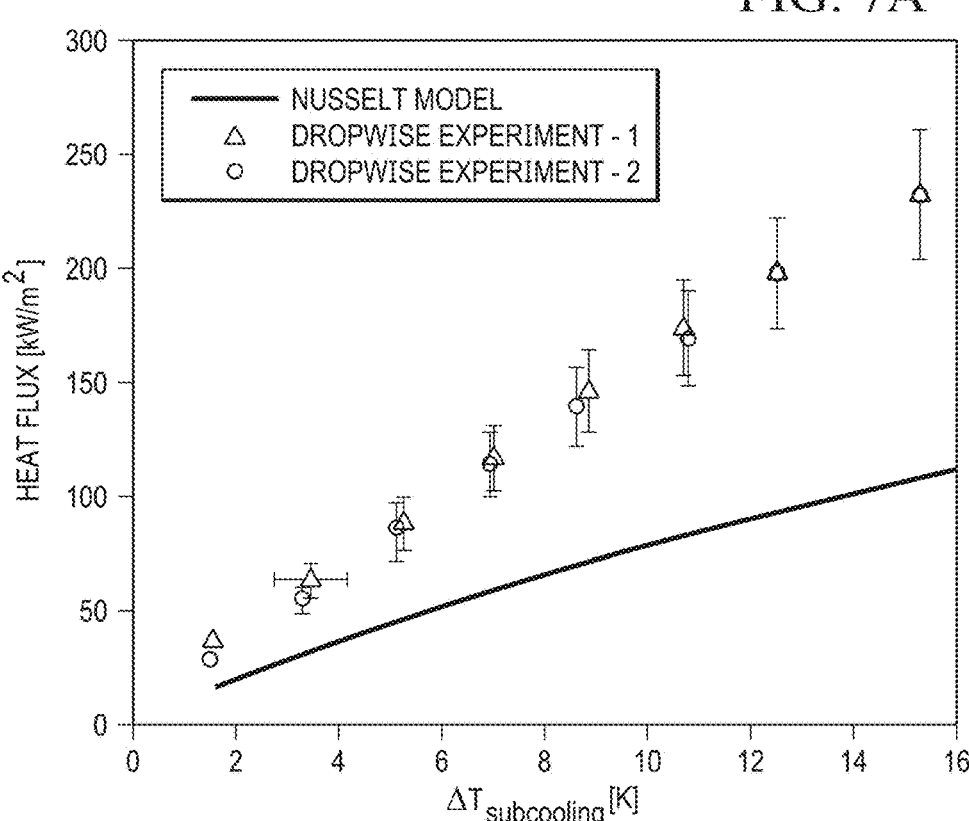
Figure 7B:
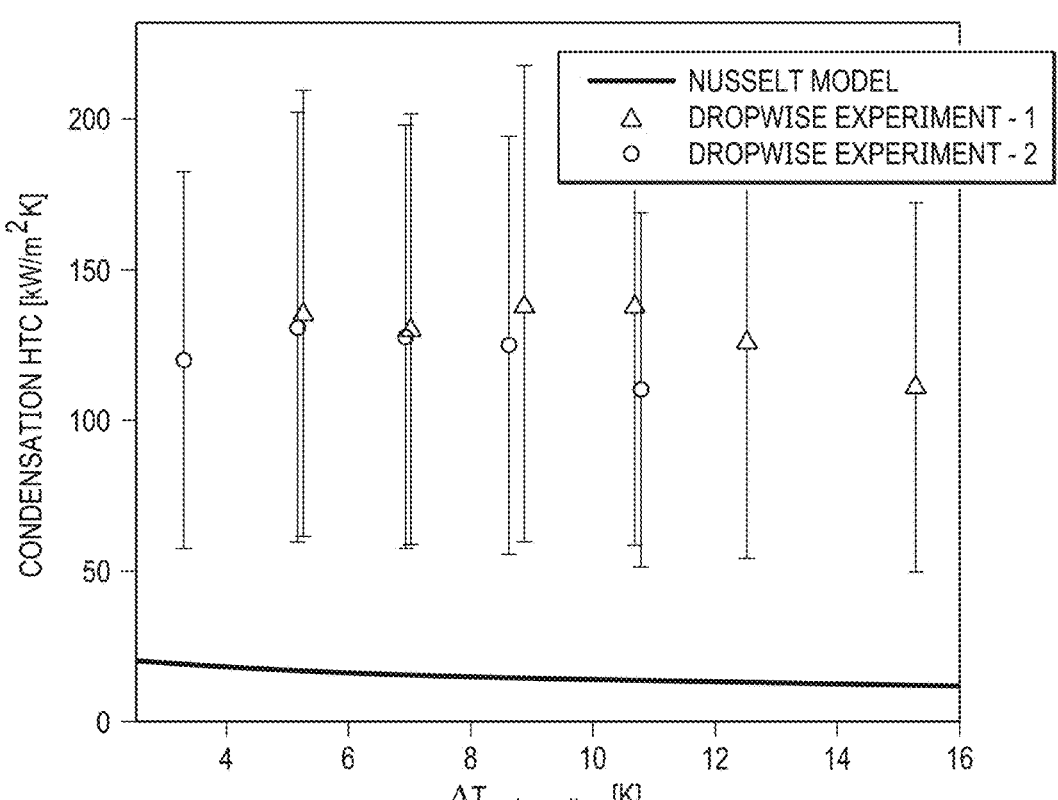

Condensation heat transfer experiments were also performed for samples prepared in the controlled and ambient environments with different plasma modification methods (i.e., OP-C, OP-A, NP-C and NP-A). Although all experimental settings were maintained the same as in the previous experiment, the vapor temperature was around 47.8° C. (standard deviation ≈0.6° C.). The two samples coated in ambient condition (i.e., OP-A and NP-A) transitioned from dropwise condensation to filmwise condensation within 20 minutes (FIGS. 7a and 7b). This confirmed the importance of the anhydrous synthesis environment in SAM coating robustness during water vapor condensation. The sample coated in the controlled condition without plasma treatment (i.e., NP-C) started to fail (i.e., partial filmwise) after condensing water vapor for ≈74 hours, and transitioned to the filmwise mode after ≈120 hours. The oxygen plasma treated sample synthesized in the controlled condition (i.e., OP-C) maintained perfect dropwise behavior after ≈360 hours of water vapor condensation, validating that oxygen plasma modification significantly enhances the coating durability during condensation. Both a controlled coating environment and oxygen plasma treatment assist in improving coating robustness during water vapor condensation.

Figure 4A:
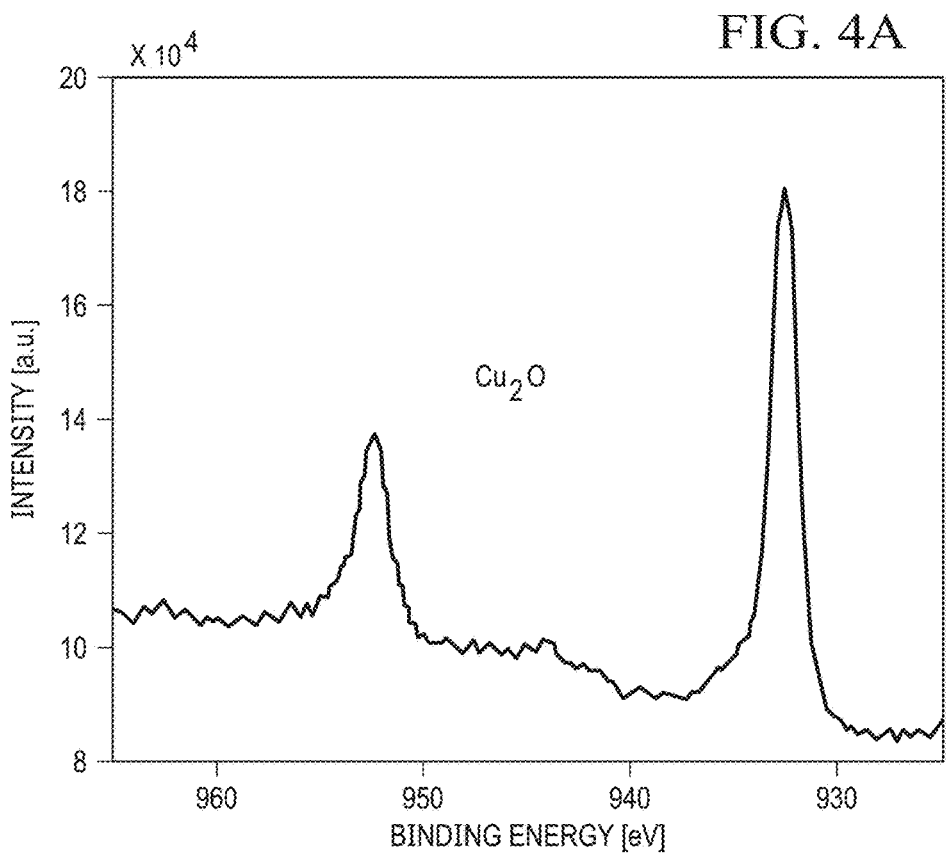
FIGS. 4a-4d illustrate XPS scans (for copper and oxygen) after ≈360 hours of water vapor condensation for copper surfaces (FIG. 4a and FIG. 4b) chemically oxidized by hydrogen peroxide solution, and (FIG. 4c and FIG. 4d) polished by sandpaper and subsequently by a mechanical polisher. The AFM scan size is 20 μm by 20 μm, and the pinhole size ranges are ≈0.5-2 μm in diameter and ≈100-400 nm in depth. The insets are corresponding advancing and receding contact angles.
Figure 4B:
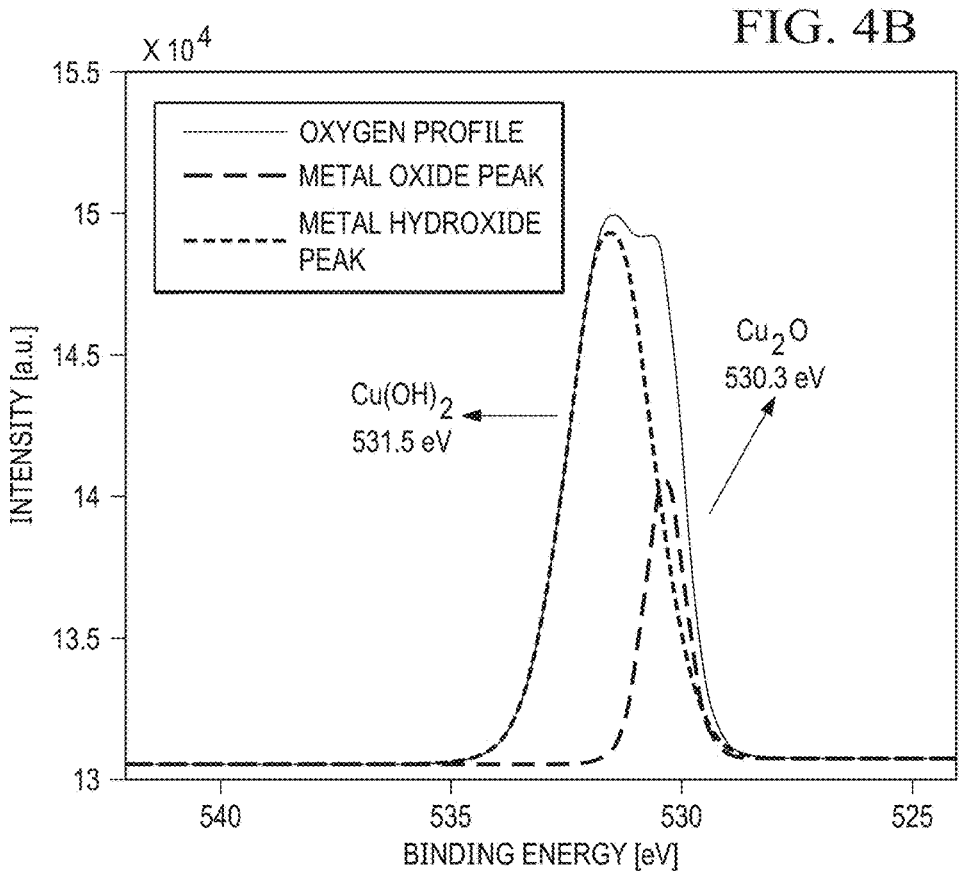
Figure 4C:
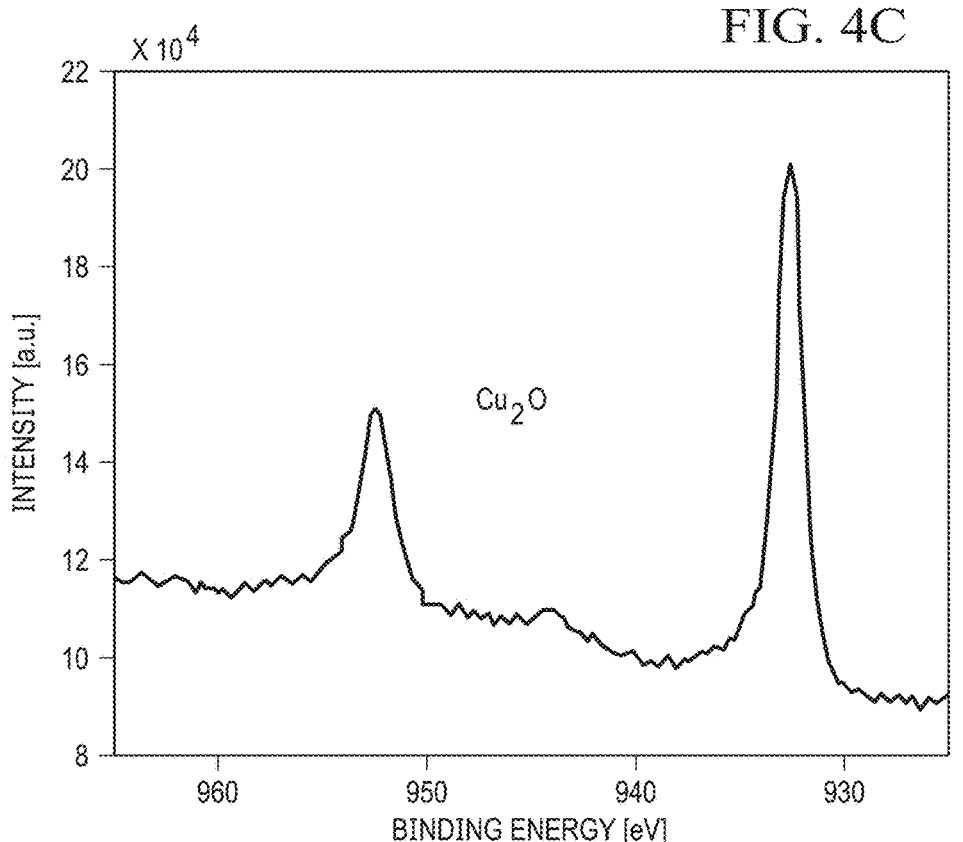
Figure 4D:
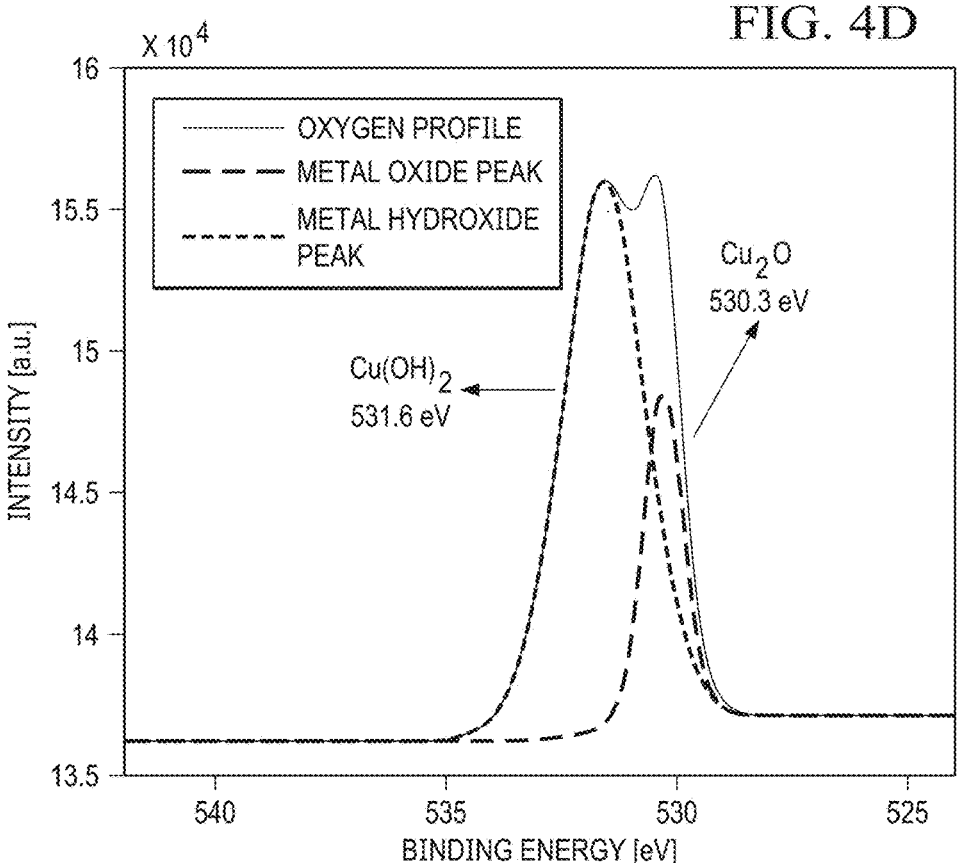

Post-condensation surface characterization. Surface characterization was first performed for copper samples with different roughness levels after terminating the water vapor condensation experiment. Several pinholes (≈0.5-2 μm in diameter and ≈100-400 nm in depth) were observed on the surface and were randomly distributed. Larger pinholes were typically deeper, and the pinhole density was lower on the mechanically polished sample (i.e., the smoothest substrate). The pinholes and the silane agglomerates contributed to an observable increase in the RMS roughness, which are ≈2× for the chemically oxidized one and ≈13× for the mechanically polished one. The receding contact angles for both samples decreased significantly to <15°. Additionally, the post-condensation Cu peaks obtained by XPS indicated cuprous oxide ($Cu_2O$) surfaces for both the chemically oxidized surface (FIG. 4b) and the mechanically polished surface (FIG. 4c), even though both samples had cupric oxide (CuO) signatures after oxygen plasma treatment and prior to the water vapor condensation testing. Oxygen XPS profiles for both samples (FIG. 4d) comprise of a copper hydroxide peak and a cuprous oxide peak.

Although the samples polished by 400 grit sandpaper and 1200 grit sandpaper maintained the same level of RMS roughness as before condensation experiments, the receding contact angles decreased to <30°. It is believed that pinholes also exist on the samples polished by 400 grit and 1200 grit sandpaper, however the ranges for the topography height (i.e., scale of the colorbar) are sufficiently high due to the inherent surface roughness that pinholes were not detectable by AFM on these rough substrates. Similar to the smoother surface samples, both sandpaper polished samples had the same $Cu_2O$ profiles and the metal oxide and hydroxide profiles from XPS measurements. All post-condensation characterization results are summarized in Table 1.

Heat transfer measurements. Water vapor condensation heat transfer experiments were conducted in a vacuum-capable environmental chamber with a measured leak rate of less than 0.5 Pa/hour at pressures below 5 Pa (nominal leak rate achieved was ≈0.2 Pa/hour below 5 Pa). Coolant water pumped through the test tube samples was supplied by a refrigerated chiller (K6, Applied Thermal Control). Stainless steel probe thermocouples (SCPSS-062U-SHX, Omega Engineering) were used to measure the temperature at various locations inside the chamber (i.e., vapor and condensate) and to monitor the coolant temperature. The water vapor pressure was measured with a Baratron® capacitance manometer (628F13TBE2B, MKS Instruments), and a MicroPirani pressure transducer (925, MKS Instruments) was used to ensure that the chamber pressure was at 1e Pa or lower before introducing water vapor at the start of each experiment. Water was degassed and maintained in a degassed state in a high-vacuum capable sealed boiler. Degassing was performed by first heating up the boiler to 100° C. with the vent valves open to atmosphere, maintaining an active boiling state for ≈30 seconds, and subsequently pulling vacuum on the boiler vapor space for at least 30 seconds with the vent valves closed. The vapor pressure in the boiler after degassing matched the saturation pressure of the liquid/vapor water temperature, within measurement uncertainties, indicating a degassed state.

Before starting the condensation experiment, the chamber was first evacuated (P<$10^{-3}$ Pa) using a combination of a vane-type vacuum pump with a liquid-$N_2$ trap and a turbomolecular vacuum pump. Coolant was then pumped through the test tube sample at 45° C. and at a volumetric flow rate of 4.9±0.1 L/min as measured by a liquid flow meter (FLR1012, Omega Engineering) placed in the return line to the chiller. Pure water vapor was introduced at 100° C., and the valve between the vapor line and the chamber was manually adjusted for each data point setting during the experiment to provide extra heating power to the system and maintain a constant wet-bulb temperature. The wet-bulb temperature was maintained at ≈48.5° C. (standard deviation <0.1° C.) throughout the experiment. The coolant temperature was varied from 45° C. to 30° C. to obtain a wide range of subcooling, and data were recorded when steady state was reached for each coolant temperature adjustment. The pressure (device uncertainty <0.02 kPa) in the condensation chamber always matched the saturation pressure calculated from the wet-bulb temperature, and this indicated that no measurable quantity of NCGs was present in the system.

Durability testing during water vapor condensation. Durability experiments were conducted on flat copper test samples using the same experimental setup reported above. All equipment and the preparation procedures (i.e., boiler degassing, chamber evacuation, etc.) were maintained the same. The coolant was supplied through an aluminum cold plate at ≈3.1 ±0.1 L/min and at ≈40° C. Degassed water was then introduced into the chamber at 100° C. for 30 mins to add a sufficient pool of water (600 mL) to the system that acts as the vapor source for long term testing. Steady state (i.e., sample surface temperature did not vary by more than ≈0.2° C. and the saturation pressure did not vary by more than ≈0.2 kPa) was reached within ≈1.5 hours. The system temperature was controlled via PID controllers connected to multiple ultra-thin polyimide heaters and wire heaters attached to the chamber body, viewports, door, and chamber stand/base. For the experiment with samples at different roughness levels, the vapor and substrate temperatures at steady state were ≈53.9° C. and ≈48.0° C., respectively (i.e., subcooling ≈5.9° C.). And for the testing of samples prepared in different coating conditions and modification methods (i.e., no plasma and $O_2$ plasma), we decreased the subcooling by introducing a larger amount of vapor/condensate to the system at the start of the experiment. The vapor and substrate temperatures at steady state for this test were ≈427.8° C. and ≈46.3° C., respectively, resulting in a subcooling of ≈1.5° C.

Results and Discussion

Surface chemistry of plasma modification. To understand the effect of plasma treatment on the copper substrate, we first performed XPS scans on a polished copper surface immediately (<15 minutes) after polishing, and the copper XPS profile (FIG. 1aa) indicates a cuprous oxide ($Cu_2O$) surface with a $Cu2p_{3/2}$ peak at 932.4 eV, a $Cu2p_{1/2}$ peak at 952.3 eV, and a weak satellite peak in between. When treated by a low pressure (≈20±0.4 Pa) pure oxygen plasma for 10 minutes, the polished surface is oxidized to cupric oxide (CuO) with a $Cu_2p_{3/2}$ peak at 934.5 eV, a $Cu_2p_{1/2}$ peak at 954.3 eV, and two satellite peaks. This profile (FIG. 1b) and the equivalent intensities of the CU2P1/2 peak and its corresponding satellite peak at 962.0 eV confirm a complete CuO surface. Oxidation of a copper surfaces to cupric oxide also occurs gradually in ambient conditions in air (FIG. 1b shows the XPS profile for an ambient air-oxidized CuO surface). The $Cu_2p_{3/2}$ peak at 932.5 eV and the $Cu_2p_{1/2}$ peak at 952.2 eV each with small satellite peaks to their left indicate the transition from $Cu_2O$ to CuO (i.e., shifting towards higher binding energy and closer to a CuO profile). However, this oxidation in ambient air is a partial oxidation as evidenced by the relatively lower intensities of the two satellite peaks in FIG. 1b.

Copper surfaces can also be chemically oxidized in hydrogen peroxide ($H_2O_2$) solution, resulting in a complete CuO profile (FIG. 1c) which is equivalent to that of a surface oxidized by oxygen plasma. The key difference between a copper surface oxidized by $O_2$ plasma and one oxidized in $H_2O_2$ solution is a metal oxide peak (i.e., CuO at 529.3 eV) and a metal hydroxide peak (i.e., $Cu(OH)_2$ at 531.4 eV) for the former as shown in FIG. 2a, and a metal oxide peak at 529.4 eV, a metal carbonate peak (i.e., $CuCO_3$ at 531.1 eV) and a weak organic peak (i.e., C=O bonds at 532.4 eV) for the latter as shown in FIG. 2b. The observed organic C=O bonds most likely result from dissolved carbon dioxide in the hydrogen peroxide solution and any airborne contaminants. By treating the $H_2O_2$ oxidized copper surface with a low-pressure oxygen plasma (≈10 minutes), the metal carbonate and organic C=O peaks are suppressed, and the metal oxide (at 529.3 eV) and metal hydroxide (at 531.6 eV) peaks typically seen after an $O_2$ plasma treatment, are recovered (FIG. 2c). Interestingly, the various copper surfaces treated by $O_2$ plasma for 10 minutes, either directly after surface polishing or with an intermediate $H_2O_2$ solution oxidization step, have a constant area ratio of hydroxide to oxide distributions 26 72:28%. It is well known that a surface metal hydroxide is favorable for uniform silane SAM formation since the silane molecules bond to hydroxyl groups (—OH) on the substrate. Therefore, substrates modified by oxygen plasma are expected to exhibit better SAM coating quality.

Figure 6:
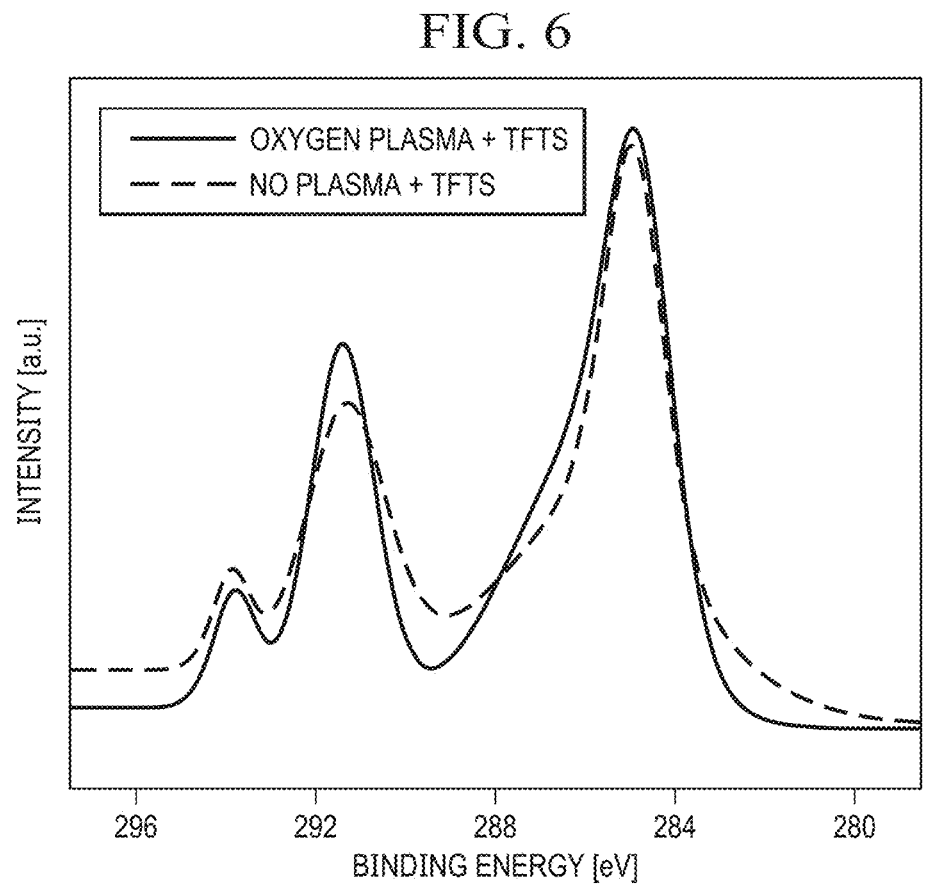

Effect of plasma modification on coating quality. Prior research studies have introduced plasma treatment (either air or oxygen) of copper surfaces prior to SAMs coating integration for the purposes of removing surface hydrocarbons and/or hydroxylating the substrate (i.e., creating —OH groups). However, beyond demonstrating a low static contact angle on a bare air/oxygen plasma treated substrate there is rarely any evidence provided for the role of the plasma in creating pristine SAMs. With an understanding of the surface chemistry resulting from a pure $O_2$ plasma treatment (i.e., creating favorable bonding sites for silane molecules), we coated trichloro(1H,1H,2H,2H-perfluorooctyl) silane (or TFTS) on (i) a polished copper surface without an intermediate $O_2$ plasma treatment step and (ii) a polished copper surface first treated with $O_2$ plasma for 10 minutes. A comparison of the XPS carbon profiles and contact angle measurements for these two samples are shown in FIG. 6 For TFTS directly deposited on polished copper, the advancing and receding contact angles are 121.6°±6.2° and 64.1°±6.5°, respectively, and the elemental atomic ratios obtained with XPS are C:Cu:F:O ≈30:8:20:42%. Comparatively, the polished copper surface when treated with an $O_2$ plasma just prior to TFTS coating exhibits a much lower contact angle hysteresis (≈18.1° with advancing and receding contact angles being 106.9°±5.8° and 88.8°±6.5°. This contact angle hysteresis is similar to that achieved for TFTS deposited on an ultra-smooth silicon surface. The corresponding XPS atomic ratios are C:Cu:F:O ≈49:3:35:13%. The higher atomic ratios for fluorine and carbon (originating from the TFTS coating), and the lower contact angle hysteresis on the oxygen plasma modified sample indicate a conformal SAM coating layer (i.e., the fluorinated silane molecules are densely packed).

Surface characterization-roughness, coating condition & plasma modification. Surface roughness is known to affect silane SAM coating quality, and this may also affect coating durability during water vapor condensation. Hence, we also studied the effect of substrate roughness on coating durability during water vapor condensation. We prepared copper substrates at four different roughness levels: samples polished by 400 grit sandpaper and 1200 grit sandpaper, oxidized by $H_2O_2$ solution and mechanically polished with a 0.05 μm polishing slurry had root mean square (RMS) roughness values (or Rq, obtained from AFM measurements with a scan size 20 μm by 20 μm) of 420 nm, 232 nm, 23 nm and 2.7 nm, respectively. All four samples were subsequently treated with oxygen plasma for 10 minutes and then coated with TFTS in a controlled environment. Oxygen plasma treatment did not affect the roughness level. For example, mechanically polished copper substrates exhibit average RMS roughness ≈2.84±0.09 nm before plasma treatment and ≈2.7±0.04 nm after oxygen plasma treatment. As a comparison, the roughness of chemically oxidized copper substrates before plasma treatment is ≈20-25 nm and ≈23 ±0.6 nm after oxygen plasma treatment.

The plasma treatment time of ≈10 minutes was adopted based on multiple experiments performed to identify the optimum plasma treatment time which resulted in a TFTS coating with minimal contact angle hysteresis. The smoothest substrate exhibited a favorably low contact angle hysteresis (≈20.3°) for TFTS, while the other three samples all have contact angle hysteresis greater than 40° (data is summarized in Table 1). A lower contact angle hysteresis is more favorable for heat transfer applications since faster droplet shedding increases condensate nucleation rate, resulting in a higher condensation heat transfer coefficient.

Our prior research has shown that a controlled/anhydrous environment is essential to creating robust silane SAM coatings during water vapor condensation on silicon substrates. Performing silane SAM synthesis in an ambient environment with moisture leads to uncoated substrate regions (i.e., defects) resulting from (i) silane agglomerates (or multilayers) caused by crosslinking of silane molecules and/or (ii) preferential wetting of water/moisture on the substrate which shields the substrate from the coating solution. These defects expand during condensation, leading to the degradation of silane SAM coatings. Here, we investigate the roles of the coating environment and oxygen plasma modification on coating durability during water vapor condensation on copper surfaces coated with TFTS. We integrate TFTS on plasma-treated copper surfaces and surfaces not treated by oxygen plasma in both a controlled (i.e., nitrogen glovebox) and an ambient (i.e., fume hood) environment. All substrates were oxidized by $H_2O_2$ prior to plasma treatment and/or TFTS coating synthesis to ensure that the RMS roughness for the underlying substrate is uniform (Rq≈23 nm) for all samples. As shown in FIG. 3, the sample treated by oxygen plasma and coated in the controlled environment (i.e., OP-C) exhibited a relatively low contact angle hysteresis ≈28.3°. Conversely, the sample treated by oxygen plasma and synthesized in ambient conditions (i.e., OP-A) had a very large advancing angle ≈164.4° and a large hysteresis ≈69.0°, with the receding angle above 90°. For substrates not treated with oxygen plasma (i.e., NP-C and NP-A for controlled and ambient environment coatings), however, the droplets advance on the surface in a Cassie-Baxter state with the advancing angles above 160° and a hysteresis greater than 110°. Note, the droplet pinned on the NP-C surface with a receding angle ≈0°. These results indicate that coatings integrated in a controlled environment on plasma-treated copper are more promising candidates to promote dropwise condensation over an extended period.

Heat transfer measurements. We also integrated the TFTS SAM coating on polished and oxygen plasma-modified copper tubes to precisely characterize heat transfer performance during water vapor condensation. The lengths (for two separate experiments), outer diameter (OD) and wall thickness of the copper tubes were ≈124 mm and ≈128 mm, 6.35 mm, and 0.89 mm, respectively, and the surface Rq after polishing was 7.98 nm (20 μm by 20 μm scan area) obtained by AFM.

Dropwise condensation was observed immediately on this TFTS-coated copper tube when water vapor was introduced into the testing chamber. We varied the subcooling from 1.6° C. to 15.3° C. by adjusting the coolant temperature, while the wet-bulb temperature in the chamber was maintained at ≈48.5° C. (standard deviation <0.1° C.). The measured heat fluxes in the dropwise experiments at various subcooling are shown in FIG. 7a, and the calculated condensation heat transfer coefficients (HTCs) from measurements and a 1D thermal resistance network are reported in FIG. 7b. The dropwise experiment (i.e., TFTS-coated copper tube) demonstrated a higher heat flux compared to the Nusselt model, and the corresponding dropwise HTC is a ≈5-7×enhancement compared to the Nusselt filmwise HTC. The measured vapor pressure in the test chamber always matched the saturation pressure (standard deviation <0.02 kPa) corresponding to the wet-bulb temperature, which indicated a saturated and NCG-free environment. We performed two separate dropwise condensation tests with two different TFTS coated tubes under the same experimental conditions to show the reproducibility of the heat transfer data and our coating procedures. We also compared the heat flux obtained from our first dropwise condensation experiment against previous work in literature that used the same TFTS coating and had similar coolant flow conditions, for a wide range of log mean temperature difference values. The higher heat flux reported in this current work is likely due to a combination of the lower level of NCGs in our experiment and a minor enhancement effect from the higher vapor temperature.

Figure 7C:
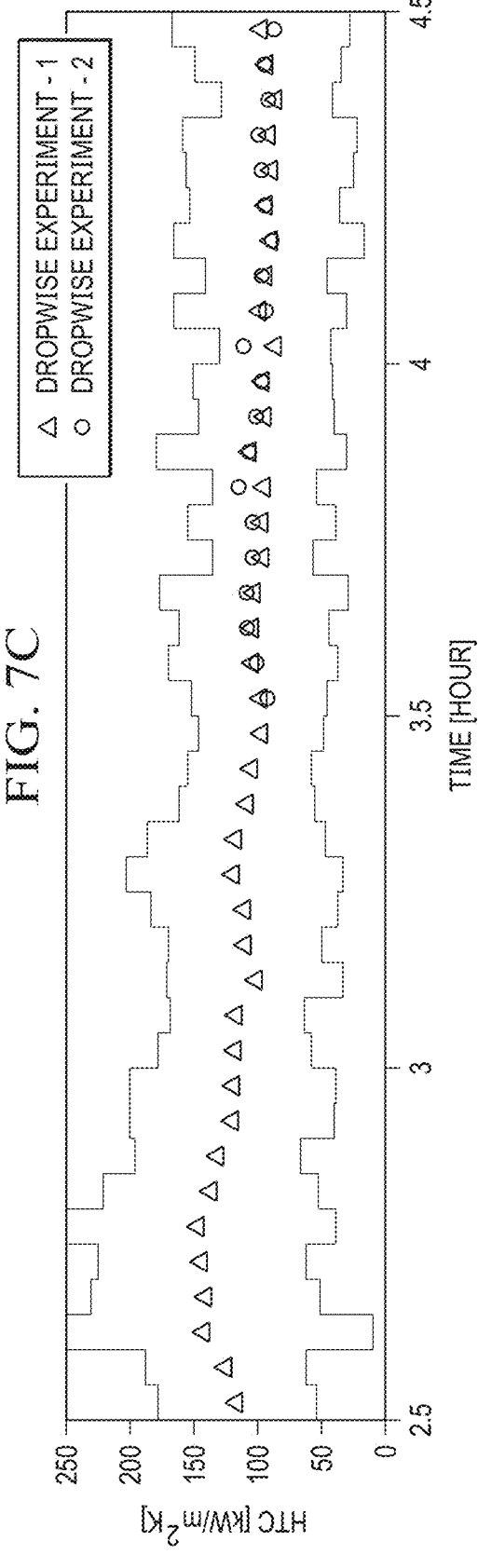

After obtaining the data at different subcooling (2.5 hours, for the first dropwise test), we adjusted the subcooling to be ≈5.3° C. and continued the experiment for 2 hours to monitor the HTC as a function of time (FIG. 7c). The first steady state data point for this constant subcooling longevity test (2.6 hours after the experiment was started) is plotted in magenta in FIGS. 7a and 7b. It overlaps with the previous data point obtained at that sub-cooling (1.0 hours after the experiment was started). This indicates that the coating did not degrade over the first 2.5 hours of condensation, and also indicates no increase in NCGs in the vapor environment. Although the HTC appears to marginally decrease between 2.5 and 4.5 hours (for the first dropwise test) at a constant subcooling ≈5.3° C., the estimated change in HTC is within the uncertainty of the measurement. Additionally, the HTC at the end of the experiment was higher than the filmwise HTC (factor of ≈5×), and the tube visually showed perfect dropwise behavior when the experiment was terminated. Similarly, for the second dropwise condensation test, the HTC remained constant between 3.5 and 4.5 hours at a constant subcooling ≈5.2° C. and condensation was in the dropwise mode. The estimated HTCs for these two individual dropwise experiments matched favorably from 3.5 to 4.5 hours. The experiments were terminated intentionally at 4.5 hours due to constraints of the test setup for the tube heat transfer measurement configuration.

Condensation heat transfer durability testing. We also characterized the durability of different copper substrates (prepared using the various methods described earlier) during active water vapor condensation heat transfer in a pure vapor environment. We terminated these durability tests before complete coating failure for most samples (i.e., we only tested up to ≈360 hours, or 15 days) to avoid a binary pass/fail result due to coating removal, and to facilitate meaningful surface characterization post water vapor condensation. When characterizing the effect of surface roughness on coating durability, all four samples demonstrated partial filmwise condensation to varying degrees after condensing water vapor for ≈360 hours. The vapor and substrate temperatures at steady state were ≈53.9° C. and ≈48.0° C., respectively (i.e., subcooling ≈5.9° C.). We define coating failure either as regions of the sample which exhibit a transition from dropwise to filmwise condensation, or the presence of large pinned droplets. The substrates polished by 400 grit sandpaper and 1200 grit sandpaper maintained small droplet diameters for the first 24 hours, and started to fail from the sample edge after ≈190 hours, when the droplet contact angles noticeably decreased. The area covered by pinned droplets also increased over time. Partial failure was observed around ≈94 hours and ≈24 hours for the H₂O₂ oxidized surface and the mechanically polished surface, respectively. We attribute this early failure on the smoother surfaces to faster droplet shedding with lower contact angle hysteresis which results in faster re-nucleation events. Faster nucleation and shedding drive more water vapor to the surface, resulting in a higher heat transfer rate and a larger quantity of pure water interacting with the coating/substrate, leading to faster coating degradation. It is interesting to note that the failure regions on these smoother surface samples did not propagate (i.e., increase in size) significantly up to the termination of the experiment at ≈360 hours, which is different from the rougher surface samples which progressively failed over time.

We also observed that the droplet departure diameters were relatively smaller on the smoother surfaces. An increasing trend for droplet departure size over time was observed on the sandpaper polished samples, suggesting that the rough surfaces underwent severe and progressive (though not total) degradation. This test demonstrated that higher quality and more durable coatings are achieved on smoother surfaces. We then characterized the durability of the samples prepared in the controlled and ambient environments with different plasma modification methods (i.e., OP-C, OP-A, NP-C and NP-A). The sub-cooling was decreased to ≈1.5° C. (vapor temperature ≈47.8° C. and substrate temperature ≈46.3° C.) from 5.9° C. in the previous test to prolong the lifetime of the NP-C and the OP-A/NP-A samples, and to conclusively demonstrate the benefits of O₂ plasma treatment and the coating environment. Despite the decreased subcooling in this test, the two samples coated in ambient conditions (i.e., OP-A and NP-A) transitioned from dropwise condensation to filmwise condensation within 20 minutes and before a true steady state was achieved for the experiment. This confirmed the importance of the anhydrous synthesis environment in SAM coating robustness during water vapor condensation, validating our prior work with a different substrate material. The sample coated in the controlled condition without plasma treatment (i.e., NP-C) started to fail (i.e., partial filmwise) after condensing water vapor for ≈74 hours, and completely transitioned to the filmwise mode after ≈120 hours. The oxygen plasma treated sample synthesized in the controlled condition (i.e., OP-C) maintained visually perfect dropwise behavior after ≈360 hours of water vapor condensation, validating that oxygen plasma modification significantly enhances the coating durability during condensation. Note that testing of this OP-C sample here is a repetition of the sample test reported in (however, at a lower subcooling). A visual comparison demonstrated that both a controlled coating environment and oxygen plasma treatment are essential to improving coating robustness during water vapor condensation. A comparison also demonstrated that the magnitude of surface subcooling (and the heat transfer rate) also plays an important role in determining the extent and rate at which coating degradation occurs during water vapor condensation.

Figure 5C:
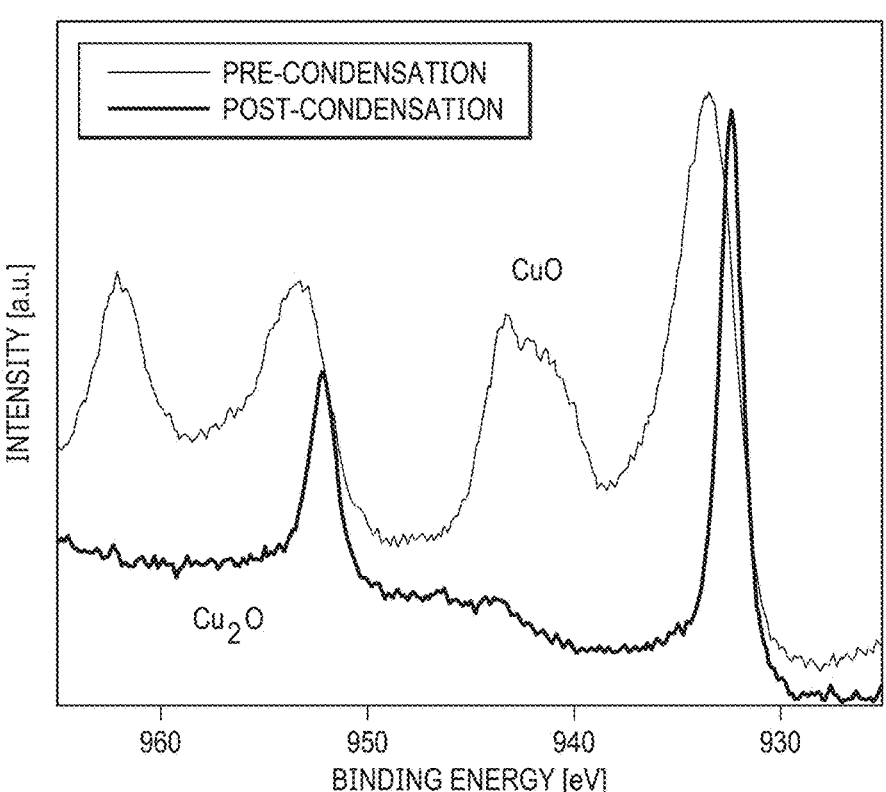
Figure 5D:
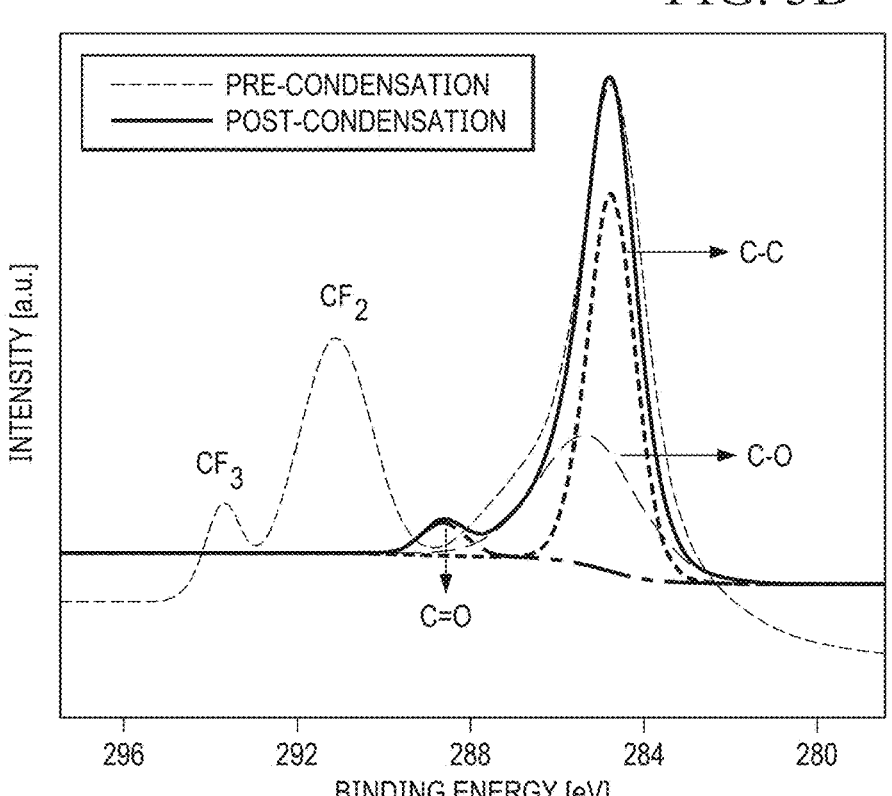

Post-condensation surface characterization. We first performed surface characterization for copper samples with different roughness levels after terminating the water vapor condensation durability experiment. AFM scans showed the H₂O₂ oxidized and the mechanically polished samples after condensation testing (360 hours). Several randomly distributed pinholes (≈0.5-2 μm in diameter and ≈10 0-40 0 nm in depth) were observed on the surface. Larger pin-holes were typically deeper, and the pinhole density was lower on the mechanically polished sample (i.e., the smoothest substrate). The pinholes and silane agglomerates contributed to an observable increase in the RMS roughness, which is ≈2×for the chemically oxidized sample and ≈13 ×for the mechanically polished sample. The receding contact angles for both samples decreased significantly to <15°. Additionally, the post-condensation Cu peaks obtained by XPS indicated a cuprous oxide (Cu₂O) composition for both the chemically oxidized surface and the mechanically polished surface, even though both samples had cupric oxide (CuO) signatures (due to oxygen plasma treatment) prior to water vapor condensation testing. Oxygen XPS profiles for both samples (FIGS. 5a and 5c) comprise of a copper hydroxide peak and a cuprous oxide peak, with a hydroxide-to-oxide ratio of 79:21%. Although the samples polished by 400 grit sandpaper and 1200 grit sandpaper maintained the same level of RMS roughness as before condensation experiments, the receding contact angles decreased to <30°. We believe that pinholes also exist on the samples polished by 400 grit and 1200 grit sandpaper, however the height ranges for the topography are sufficiently large due to the inherent surface roughness that pinholes are not detectable by AFM on these rough substrates. Similar to the smoother surface samples, both sandpaper polished samples had the same Cu2O profiles (Cu peak) and the metal oxide and hydroxide profiles (O peak) from XPS measurements. The AFM and XPS results for these two rougher samples can be found in the Supplementary Material S5. All post-condensation characterization results are summarized in Table 1. We also characterized the samples created in the controlled and ambient environments with different plasma modification methods (i.e., OP-C, OP-A, NP-C and NP-A) after condensing water vapor on them for ≈360 hours. AFM topography scans of the OP-C and the NP-C samples with representative images of receding droplets, respectively. No obvious pinholes were observed for 20 μm by 20 μm AFM scans at multiple locations on the samples. This is attributed to the fact that the coating on the OP-C sample may have been at an initial stage of degradation, and the coating on NP-C sample was completely degraded. A comparison of the tests further validates our hypothesis that the surface subcooling magnitude (and the rate of heat transfer) affects the rate of coating (and substrate) degradation. The existence of pinholes serves as an indicator for the progression of coating degradation (i.e., partial dropwise mode), and the combined indicators of filmwise condensation and an absence of pinholes demonstrates complete coating removal. Although visually favorable dropwise condensation behavior was observed for the OP-C sample throughout the ≈360 hours experiment, the contact angle hysteresis increased from 28.3° to 64.7° ($\theta_{adv}$=101.9°±8.2°, $\theta_{rec}$=37.2°±8.2° after ≈360 hours of condensation), and the RMS roughness also moderately decreased (13.9 nm or ≈0.5×) after the condensation experiment, which are signs of a minor degradation of the OP-C sample coating. The XPS copper profile (FIG. 5a) indicates that the substrate reduces from cupric oxide (CuO, created by oxygen plasma treatment) to cuprous oxide (Cu2O) during condensation. The decrease in peak intensity for CF$_2$ bonds and the disappearance of the CF 3 peak in the XPS carbon profile (FIG. 5b) also confirmed the trend of a minor coating degradation and explains the increase in contact angle hysteresis. The NP-C sample exhibited a higher RMS roughness (≈34.5 nm or ≈1.5×) with several agglomerates on the surface. The advancing angle changed from 162.4°±5.9° to 141.1°±8.7°, and the receding angle reduced to ≈0° with a thin liquid film wetting the surface. This NP-C substrate also transitioned from CuO to Cu2O similar to the OP-C sample (FIG. 5c), but the CuO was created by the chemical oxidation with the hydrogen peroxide solution, since the NP-C sample did not undergo any plasma treatment. Additionally, the disappearance of the CF$_2$ and CF$_3$ peaks in the carbon profile suggest a severe-to-complete coating degradation (FIG. 5d), which is supported by contact angle measurements. We also characterized the OP-A and the NP-A samples after ≈360 hours of water vapor condensation, although both samples failed within the first 20 mins of condensation.

Discussion—Mechanism for condensation-mediated degradation of silane SAMs on copper. Given the limitation of mechanical polishing with polycrystalline diamond slurries and the fact that copper is a soft metal, polished copper surfaces cannot be as smooth as silicon surfaces. Despite this, an RMS roughness lower than 3 nm (20 μm by 20 μm) was achieved on flat polished copper surfaces. Due to the minimal thickness of the silane SAM coatings (<1 nm), this level of surface roughness may still contribute to the formation of coating defects (i.e., uncoated and/or partially coated regions such as nanogrooves created during polishing), even if the controlled/anhydrous condition eliminates cross-linking of silane molecules and guarantees a monolayer coating. During the process of condensation, water vapor preferentially condenses on such coating defects due to their higher surface energy compared to the coating. The condensate likely dissolves or reduces the oxide interfacial layer between the copper substrate and coating, creating pinholes and removing the silane monolayer coating. Therefore, we suggest that coating degradation originates from coating defects and propagates radially outwards from the defect site during water vapor condensation. However, since the pinholes are randomly distributed and only occupy part of the surface, a majority of the surface area would remain coated, leading to partial dropwise condensation with pinned droplets, and complete coating degradation is likely to occur over extended testing periods. The significantly decreased receding contact angles result from these pinholes (or exposed substrate regions), because the receding contact angle is determined by hydrophilic defects on a hydrophobic surface. Pinning of the droplet at such defect sites likely prolongs water contact with the substrate and accelerates coating degradation. In addition to pinholes, the post-condensation XPS results indicate that the cupric oxide (CuO) layer was reduced to cuprous oxide (Cu2O) for all surface treatments. The reduction of the surface oxide results in (or may be an indicator of) the possible removal of a Si—O—Cu "oxane" linkage which weakens bonding between the silane SAM and the copper substrate and may lead to removal of silane molecules and/or the entire SAM coating over time. It is likely that this reduction chemical reaction occurs at defect sites during water vapor condensation regardless of the extent of coating degradation. The gradual change in the surface color qualitatively confirms the occurrence of chemical reactions at the coating-substrate interface. Substrate color changes, while maintaining good dropwise condensation, have been previously observed on polymer coated surfaces (nominally a thicker coating). There, copper-nickel coated with Nedox® turned dark after 24 hours, copper and brass coated with No-stik turned green after 22,000 hours, and copper-nickel coated with NRL C-6 Fluoroepoxy turned black after 1,000 hours. The color change of the copper surface was believed to be attributable to the oxidation of the copper substrates, which is consistent with the change in color they observed (black and green being common colors of copper compounds). However, we believe that what we observed was a reduction reaction instead of oxidation, with the color approaching that of bare polished copper, i.e., without its native oxide. This observation is validated by the XPS spectra that show a transition from CuO to Cu2O. Further studies are required to probe the degradation behavior over time from a local (i.e., coating-substrate interface) and a global (i.e., applied heat transfer) perspective, which will shed additional light on the degradation mechanism.

Through this work, we have considerably enhanced the durability of the silane SAM coating on copper surfaces by more than 500× during water vapor condensation compared to what has been previously reported in literature. The enhancement is facilitated via : (i) polishing the copper surface to an ultra-smooth level to minimize any uncoated regions/defects and achieve low contact angle hysteresis, (ii) leveraging a pure oxygen plasma to terminate the copper substrate with sufficient copper hydroxide to bond with silane molecules, and (iii) synthesizing the SAM coating in a controlled/anhydrous environment with anhydrous solvents to create a conformal coating without defects (i.e., cross-linked multilayers or uncoated substrate). We deposited TFTS SAM coatings in different coating conditions (i.e., controlled and ambient) with and without oxygen plasma modification, and performed durability tests by actively condensing water vapor on the surfaces in a NCG-free environment. The plasma modified sample coated in the controlled condition exhibited higher fluorine and carbon atomic ratios, and was able to promote dropwise condensation after ≈360 hours (or 15 days) without noticeable changes in the droplet departure diameter. Based on these observations, we hypothesize that the oxygen plasma removes surface hydrocarbons, and chemically transforms the substrate surface into a complete cupric oxide layer with a copper hydroxide interface that readily bonds to the silane molecule and creates a robust SAM. Additionally, the controlled anhydrous/moisture-free coating integration condition is shown to provide the largest benefit (more than oxygen plasma treatment or surface roughness) to coating durability when condensing water vapor in the testing timescales studied here. We also studied the effect of surface roughness on TFTS SAM coating robustness during water vapor condensation. All four roughness levels tested demonstrated partial dropwise behavior after condensing water vapor for ≈360 hours, indicating that coating durability is moderately dependent on substrate roughness and highly dependent on the oxygen plasma treatment in the timescales studied. Despite the nominal durability (for the timescales studied here, <500 hours) of samples with different roughness values, the lowest contact angle hysteresis (≈20°) was achieved on the mechanically polished copper surface (Rq<3 nm), which is also the lowest reported contact angle hysteresis on silane coated copper surfaces to our knowledge. This lower contact angle hysteresis of the polished copper substrate makes it the favored option for enhanced condensation heat transfer applications over the long term. Based on our condensation-mediated silane SAM degradation hypothesis we can conclude from these results and our past work that long term durability of the coatings will be dictated by the substrate surface roughness since the roughness affects silane SAM coating quality/density. For industrially relevant timescales, atomistically smooth surfaces with high silane SAM packing densities are likely to achieve the required durability if the $O_2$ plasma treatment and anhydrous coating environment requirements are met. Our condensation heat transfer measurements on TFTS-coated copper tubes demonstrated heat transfer coefficients comparable to the maximum HTCs expected from dropwise condensation models published in literature. A consistent dropwise condensation HTC enhancement of ≈5-7×the filmwise HTC was achieved while sustaining visually perfect dropwise behavior on the coated copper tube for extended periods of time. The visually (i.e., droplet departure sizes) and measured (i.e., heat transfer performance) dropwise behavior belied the formation and growth of coating defects during the water vapor condensation process, likely due to the finite level of surface roughness on all substrates tested. Based on our post water vapor condensation surface characterization and analysis, we propose that the condensed water reacts with the substrate interface at coating defect sites (i.e., uncoated or partially coated regions resulting from the >1 nm scale surface roughness) to create scattered pinholes. These pinholes grow radially outwards during water vapor condensation leading first to local coating degradation (i.e., partial dropwise behavior) and eventually total coating failure (i.e., complete filmwise behavior). Post-condensation characterization indicates that the reaction occurring at the substrate interface is a reduction reaction from cupric oxide (CuO) to cuprous oxide ($Cu_2O$) which is soluble in water. This is different from a prior hypothesized oxidative degradation mechanism for copper substrates coated with low surface energy materials, and our hypothesis is further supported by the substrate color which visibly transitioned from dark brown to bright orange/pink during water vapor condensation. We hypothesize that the lack of NCGs (especially oxygen) in our test setup is a likely reason for why we observe reduction of CuO to $Cu_2O$ as opposed to further oxidation. We are currently exploring this observation further by probing time-dependent TFTS-coated copper surface transformations during water vapor condensation. The novel insights from this work provide guidelines to develop durable ultrathin coatings for metal surfaces in enhanced heat/mass transfer technologies in a variety of industrial applications.

As illustrated above, a process was developed which will enable the creation of long-term durable and robust dropwise condensation heat transfer promoter coatings on metal oxide surfaces. Demonstrated herein first was a developed understanding of how ultra-thin (<5 nm) dropwise condensation promoter coatings such as organofunctional silane degrade during water vapor condensation. This knowledge was then leveraged to develop coating integration/synthesis procedures that resulted in extremely high durability (statistically significant, during water vapor condensation) silane coatings on metal oxide surfaces as compared to traditional processes for silane coating synthesis/integration on similar metal oxide surfaces.

Additionally, organofunctional silane-like monolayer coatings are often used as an adhesion layer between the metal oxide surface and thicker hydrophobic polymer (e.g., fluoro-polymers, parylene, etc.) coatings for dropwise condensation heat transfer applications. However, given that these thicker polymer coatings must still be "thin" (nominally <200 nm) to enhance heat transfer performance during condensation, they fail prematurely due to the presence of defects such as "pin-holes". The use of pristine quality silane adhesion layers that are now possible through the procedures disclosed herein will reduce the deleterious effects of these pin-hole defects in thicker polymer coatings, and ultimately extend the life of the dropwise condensation promoter coating.

Various innovations in the procedure disclosed herein, as compared to traditional procedures for organofunctional silane integration on metal oxide surfaces for enhanced dropwise condensation heat transfer applications, include, but are not limited to: (i) coating integration in an anhydrous (i.e., water/moisture-free) environment; and (ii) creation of a large number (approaching closed packing) of bonding sites on the metal oxide surface for the head groups of the organofunctional silane molecule to bond.

To develop the processes/procedures disclosed herein, understanding why traditional organofunctional silane coatings fail during water vapor condensation heat transfer was reviewed. Leveraging that knowledge lead to the novel procedures, such as, but not limited to: (i) changing the environment in which the coating process was performed (i.e., integrating the organofunctional silane coatings on metal oxide surfaces in a moisture/water-free or anhydrous environment); and (ii) creating a large number of bonding sites for the head groups of the organofunctional silane molecule to bond (i.e., via solution-based or plasma-based treatments).

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A heat transfer composition or material comprising a coating consisting of organofunctional silane and a polished substrate having a root mean square roughness of between 1 to 5 nm.

2. A heat transfer composition or material comprising:

a polished substrate having a root mean square roughness of between 1 to 5 nm;

a metal oxide layer on a surface of the polished substrate; and a coating on the metal oxide layer, the coating consisting of:

organofunctional silane molecules uniformly aligned on the metal oxide layer; and wherein the uniformly aligned arrangement comprises contact angle hysteresis of trichloro(octadecyl) silane (OTCS) on Si: $\theta_{adv}=102.7°\pm6.5°$, $\theta_{rec}=95.4°\pm5.1°$; trichloro(1H,1H,2H,2H-perfluorooctyl) silane (TFTS) on Si: $\theta_{adv}=105.2°\pm5.0°$, $\theta_{rec}=95.0°\pm5.0°$; or TFTS on Cu: $\theta_{adv}=110.9°\pm6.4°$, $\theta_{rec}=90.6°\div4.4°$.

3. The heat transfer composition or material of claim 2, wherein the polished substrate comprises a metal selected from the group consisting of copper (Cu), tin (Sn), iron (Fe), aluminum (Al), silicon (Si), nickel (Ni), titanium (Ti), and stainless steel.

4. The heat transfer composition or material of claim 2, wherein the coating has a density in a range of 70 to 100% coverage.

5. The heat transfer composition or material of claim 2, wherein the coating has a thickness less than 200 nm.

6. The heat transfer composition or material of claim 2, wherein the coating has a thickness less than 3 nm.

7. The heat transfer composition or material of claim 2, wherein the coating has a thickness between 10 to 100 nm.

8. The heat transfer composition or material of claim 2, wherein organofunctional silane molecules comprise trichloro (1H,1H,2H,2H-perfluorooctyl) silane (TFTS) and trichloro(octadecyl) silane (OTCS).

9. The heat transfer composition or material of claim 2, wherein the coating acts as an adhesion layer.

*    *    *    *    *